US012075966B2

(12) United States Patent
Conrad

(10) Patent No.: US 12,075,966 B2
(45) Date of Patent: Sep. 3, 2024

(54) HOUSEHOLD APPLIANCE HAVING AN IMPROVED CYCLONE AND A CYCLONE FOR SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 99 days.

(21) Appl. No.: 17/394,766

(22) Filed: Aug. 5, 2021

(65) Prior Publication Data

US 2023/0037757 A1 Feb. 9, 2023

(51) Int. Cl.

| | |
|---|---|
| ***A47L 9/16*** | (2006.01) |
| ***A47L 5/24*** | (2006.01) |
| ***B04C 3/06*** | (2006.01) |
| ***B04C 9/00*** | (2006.01) |
| ***B04C 11/00*** | (2006.01) |

(52) U.S. Cl.

CPC ................ *A47L 9/165* (2013.01); *A47L 5/24* (2013.01); *A47L 9/1608* (2013.01); *A47L 9/1666* (2013.01); *B04C 3/06* (2013.01); *B04C 9/00* (2013.01); *B04C 11/00* (2013.01); *B04C 2009/004* (2013.01); *B04C 2009/005* (2013.01)

(58) Field of Classification Search

CPC ...... A47L 9/165; A47L 9/1608; A47L 9/1666; A47L 9/1683; A47L 5/24; A47L 9/16; A47L 9/1658; B04C 3/06; B04C 3/00; B04C 9/00; B04C 11/00; B04C 2009/004; B04C 2009/005

See application file for complete search history.

(56) References Cited

U.S. PATENT DOCUMENTS

| | | | |
|---|---|---|---|
| 4,260,401 | A | 4/1981 | Truhan et al. |
| 5,268,845 | A | 12/1993 | Startup et al. |
| 5,402,059 | A | 3/1995 | Bittar |
| 5,694,029 | A | 12/1997 | Hayes et al. |
| 5,742,153 | A | 4/1998 | McEachern et al. |
| 5,798,633 | A | 8/1998 | Larsen et al. |
| 5,831,420 | A | 11/1998 | Myers |
| 6,031,357 | A | 2/2000 | Yano et al. |
| 6,081,104 | A | 6/2000 | Kern |
| 6,090,184 | A | 7/2000 | Cartellone |
| 6,195,835 | B1 | 3/2001 | Song et al. |
| 6,307,358 | B1 | 10/2001 | Conrad |

(Continued)

FOREIGN PATENT DOCUMENTS

| | | | |
|---|---|---|---|
| CA | 2420497 | A1 | 4/2001 |
| CA | 2420497 | C | 6/2011 |

(Continued)

OTHER PUBLICATIONS

WO2017056400_Translated_Description (Year: 2017).*

(Continued)

*Primary Examiner* — David S Posigian
*Assistant Examiner* — Jacob Adam Montgomery
(74) *Attorney, Agent, or Firm* — Philip C. Mendes da Costa; BERESKIN & PARR LLP/S.E.N.C.R.L. s.r.l.

(57) ABSTRACT

A cyclone for a hand vacuum cleaner has an outlet port that is sized to produce an annular flow band in the cyclone which extends radially inwardly to overlap the solid sidewall of the vortex finder.

17 Claims, 16 Drawing Sheets

(56) References Cited

U.S. PATENT DOCUMENTS

| | | | | |
|---|---|---|---|---|
| 6,311,366 | B1 | 11/2001 | Sepke et al. | |
| 6,334,234 | B1 * | 1/2002 | Conrad | B04C 5/103 15/350 |
| 6,457,205 | B1 | 10/2002 | Conrad | |
| 6,547,856 | B2 | 4/2003 | Cartellone | |
| 6,647,587 | B1 | 11/2003 | Ohara et al. | |
| 6,890,375 | B2 | 5/2005 | Huber | |
| 6,891,355 | B2 | 5/2005 | Kernahan | |
| 6,909,266 | B2 | 6/2005 | Kernahan et al. | |
| 7,135,051 | B2 | 11/2006 | Baldinger et al. | |
| 7,159,270 | B2 | 1/2007 | Genoa et al. | |
| 7,163,568 | B2 | 1/2007 | Sepke et al. | |
| 7,171,724 | B2 | 2/2007 | Follegot et al. | |
| 7,291,193 | B2 | 11/2007 | Oh et al. | |
| 7,335,242 | B2 | 2/2008 | Oh | |
| 7,370,387 | B2 | 5/2008 | Walker | |
| 7,381,248 | B2 | 6/2008 | Kim et al. | |
| 7,488,362 | B2 | 2/2009 | Jeong et al. | |
| 7,615,089 | B2 | 11/2009 | Oh | |
| 7,645,309 | B2 | 1/2010 | Jeong et al. | |
| 7,731,769 | B2 | 6/2010 | Min | |
| 7,757,344 | B2 | 7/2010 | Min et al. | |
| 7,887,612 | B2 | 2/2011 | Conrad | |
| 8,152,877 | B2 | 4/2012 | Greene | |
| 8,167,964 | B2 * | 5/2012 | Wai | B01D 50/20 55/300 |
| 8,225,456 | B2 | 7/2012 | Håkan et al. | |
| 8,959,707 | B2 | 2/2015 | Maeda et al. | |
| 9,034,067 | B2 | 5/2015 | Chen | |
| 9,451,852 | B2 | 9/2016 | Conrad | |
| 2001/0048295 | A1 | 12/2001 | Joch | |
| 2002/0073663 | A1 | 6/2002 | Sepke et al. | |
| 2002/0178701 | A1 | 12/2002 | Oh | |
| 2003/0173940 | A1 | 9/2003 | Kovarik et al. | |
| 2003/0182757 | A1 | 10/2003 | Sepke | |
| 2003/0200622 | A1 | 10/2003 | Park et al. | |
| 2004/0051510 | A1 | 3/2004 | Saggini et al. | |
| 2004/0095118 | A1 | 5/2004 | Kernahan | |
| 2006/0037291 | A1 | 2/2006 | Oh et al. | |
| 2006/0042039 | A1 | 3/2006 | McDowell | |
| 2006/0156508 | A1 | 7/2006 | Khalil | |
| 2006/0236663 | A1 | 10/2006 | Oh | |
| 2007/0200540 | A1 | 8/2007 | Hashimoto et al. | |
| 2007/0209519 | A1 | 9/2007 | Conrad | |
| 2007/0226946 | A1 | 10/2007 | Best | |
| 2008/0040883 | A1 | 2/2008 | Beskow et al. | |
| 2008/0134460 | A1 | 6/2008 | Conrad | |
| 2008/0178416 | A1 | 7/2008 | Conrad | |
| 2008/0191675 | A1 | 8/2008 | Besser et al. | |
| 2008/0244858 | A1 | 10/2008 | Shaver et al. | |
| 2009/0271941 | A1 * | 11/2009 | Coburn | A47L 9/165 15/334 |
| 2010/0083833 | A1 | 4/2010 | Morphey | |
| 2010/0132319 | A1 | 6/2010 | Ashbee et al. | |
| 2010/0175217 | A1 | 7/2010 | Conrad | |
| 2010/0175219 | A1 | 7/2010 | Soen et al. | |
| 2010/0229321 | A1 | 9/2010 | Dyson et al. | |
| 2010/0242209 | A1 | 9/2010 | Beskow et al. | |
| 2011/0219570 | A1 | 9/2011 | Conrad | |
| 2011/0289719 | A1 | 12/2011 | Han et al. | |
| 2012/0222259 | A1 | 9/2012 | Conrad | |
| 2013/0091660 | A1 | 4/2013 | Smith | |
| 2013/0091661 | A1 | 4/2013 | Smith | |
| 2013/0091812 | A1 | 4/2013 | Smith | |
| 2013/0091813 | A1 | 4/2013 | Smith | |
| 2014/0237764 | A1 * | 8/2014 | Conrad | A47L 9/165 55/318 |
| 2014/0245564 | A1 * | 9/2014 | Conrad | A47L 5/225 15/353 |
| 2016/0113459 | A1 | 4/2016 | Song | |
| 2016/0174789 | A1 * | 6/2016 | Han | A47L 5/362 15/327.1 |
| 2016/0353954 | A1 * | 12/2016 | Kleine-Doepke | B01D 45/16 |
| 2016/0367094 | A1 | 12/2016 | Conrad | |
| 2017/0008014 | A1 | 1/2017 | Van Wolferen et al. | |
| 2017/0079494 | A1 | 3/2017 | Conrad | |
| 2017/0303754 | A1 | 10/2017 | Conrad et al. | |
| 2018/0325339 | A1 | 11/2018 | Conrad | |
| 2018/0353032 | A1 * | 12/2018 | Conrad | B04C 5/04 |
| 2019/0090701 | A1 | 3/2019 | Tonderys et al. | |
| 2019/0174986 | A1 | 6/2019 | Conrad | |
| 2019/0290082 | A1 * | 9/2019 | Conrad | A47L 5/24 |
| 2020/0122161 | A1 | 4/2020 | Conrad | |
| 2021/0127914 | A1 | 5/2021 | Conrad | |

FOREIGN PATENT DOCUMENTS

| | | | | |
|---|---|---|---|---|
| CA | 2932322 | A1 | 5/2015 | |
| CN | 2647434 | Y | 10/2004 | |
| CN | 1969739 | A | 5/2007 | |
| CN | 201082150 | Y | 7/2008 | |
| CN | 101612025 | A | 12/2009 | |
| CN | 201529088 | U | 7/2010 | |
| CN | 102188208 | A | 9/2011 | |
| CN | 202277306 | U | 6/2012 | |
| CN | 102670134 | B | 10/2014 | |
| CN | 106551654 | A | 4/2017 | |
| CN | 208693159 | U | 4/2019 | |
| DE | 20109699 | U1 | 11/2001 | |
| DE | 10132690 | A1 | 7/2002 | |
| DE | 60012203 | T2 | 8/2004 | |
| DE | 60201666 | T2 | 11/2004 | |
| DE | 202012101457 | U1 | 8/2012 | |
| EP | 1714703 | A2 | 10/2006 | |
| EP | 2064981 | A1 | 3/2009 | |
| EP | 2915473 | B1 | 1/2018 | |
| FR | 2940901 | A1 | 7/2010 | |
| GB | 2375980 | B | 8/2003 | |
| GB | 2449484 | B | 4/2009 | |
| JP | 2010227287 | A | 10/2010 | |
| JP | 2011160820 | A | 8/2011 | |
| JP | 51026273 | B2 | 1/2013 | |
| KR | 1020050091829 | A | 9/2005 | |
| KR | 1020050091830 | A | 9/2005 | |
| KR | 1020050091833 | A | 9/2005 | |
| KR | 1020050091834 | A | 9/2005 | |
| KR | 1020050091835 | A | 9/2005 | |
| KR | 1020050091836 | A | 9/2005 | |
| KR | 1020050091837 | A | 9/2005 | |
| KR | 1020050091838 | A | 9/2005 | |
| KR | 1020050103343 | A | 10/2005 | |
| KR | 1020050104614 | A | 11/2005 | |
| KR | 100709418 | B1 | 4/2007 | |
| WO | 95/22190 | A1 | 8/1995 | |
| WO | 1995022190 | A1 | 8/1995 | |
| WO | 03/034566 | A1 | 4/2003 | |
| WO | 2003034566 | A1 | 4/2003 | |
| WO | 03/090596 | A1 | 11/2003 | |
| WO | 2003090596 | A1 | 11/2003 | |
| WO | 2004041054 | A1 | 5/2004 | |
| WO | 2007136675 | A2 | 11/2007 | |
| WO | 2008070962 | A1 | 6/2008 | |
| WO | 2008145960 | A2 | 12/2008 | |
| WO | WO-2017056400 | A1 * | 4/2017 | A47L 9/16 |

OTHER PUBLICATIONS

English machine translation of JP2011160820A, published on Aug. 25, 2011.

English machine translation of JP2010227287, published on Oct. 14, 2010.

English machine translation of CN1969739, published on May 30, 2007.

English machine translation of CN201082150, published on Jul. 9, 2008.

English machine translation of CN106551654, published on Apr. 5, 2017.

English machine translation of the Abstract, CN201529088, published on Jul. 21, 2010.

English machine translation of CN102670134B, published on Oct. 1, 2014.

(56) References Cited

OTHER PUBLICATIONS

English machine translation of KR100709418B1, published on Apr. 12, 2007.
English machine translation of JP510262273, published on Jan. 23, 2013.
English machine translation of CN2647434, published on Oct. 13, 2004.
English machine translation of FR2940901, published on Jul. 16, 2010.
English machine translation of CN208693159, published on Apr. 5, 2019.
TotalPatent One: English machine translation of KR1020050104614 published on Nov. 3, 2005.
TotalPatent One: English machine translation of KR1020050103343, published on Oct. 31, 2005.
TotalPatent One: English machine translation of KR1020050091838, published on Sep. 15, 2005.
TotalPatent One: English machine translation of KR1020050091837, published on Sep. 15, 2005.
TotalPatent One: English machine translation of KR1020050091836, published on Sep. 15, 2005.
TotalPatent One: English machine translation of KR1020050091835, published on Sep. 15, 2005.
TotalPatent One: English machine translation of KR1020050091834, published on Sep. 15, 2005.
TotalPatent One: English machine translation of KR1020050091833, published on Sep. 15, 2005.
TotalPatent One: English machine translation of KR1020050091830, published on Sep. 15, 2005.
TotalPatent One: English machine translation of KR1020050091829, published on Sep. 15, 2005.
TotalPatent One: English machine translation of DE202012101457, published on Aug. 16, 2012.
TotalPatent One: English machine translation of CN202277306, published on Jun. 20, 2012.
TotalPatent One: English machine translation of CN102188208, published on Sep. 21, 2011.
TotalPatent One: English machine translation of CN101612025, published on Dec. 30, 2009.
English machine translation of DE60201666, published on Nov. 25, 2004.
TotalPatent One: English machine translation of DE60012203, published on Aug. 19, 2004.
TotalPatent One: English machine translation of DE20109699, published on Nov. 15, 2001.
TotalPatent One: English machine translation of DE10132690, published on Jul. 18, 2002.
TotalPatent One: english machine translation of CN1969739, published on May 30, 2007.

* cited by examiner

HOUSEHOLD APPLIANCE HAVING AN IMPROVED CYCLONE AND A CYCLONE FOR SAME

FIELD

This disclosure relates generally to cyclones such as for use in household appliances, such as a surface cleaning apparatus.

INTRODUCTION

The following is not an admission that anything discussed below is part of the prior art or part of the common general knowledge of a person skilled in the art.

Cyclones facilitate the separation of dirt and/or debris from an air flow that passes through an appliance. Various types of cyclones for use in portable, low power appliances are known. For example, cyclones are commonly found in products such as corded and cordless vacuum cleaners.

Cyclones that are commonly found in appliances are generally optimized for one of size or cleaning efficiency. That is, as cyclone become smaller, certain performance characteristics, such as, for example, air flow, suction, and/or back pressure, may be hindered as a result. It is to be understood that the term air flow refers to the volume of air (e.g., CFM) as it enters (i.e., is sucked/drawn into) an inlet of the appliance.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to a broad aspect, cyclones may be used within a household appliance to facilitate the separation of dirt and/or debris from an air flow. The size of the cyclone within the household appliance can have a direct influence on the overall size of that household appliance. Accordingly, as the demand for smaller appliances increases, the demand for smaller cyclones may heighten as well.

However, reducing the size of the cyclone may reduce the efficiency of the cyclone (i.e., the ability to separate the dirt and/or debris from the air flow) and/or the efficiency of the appliance (i.e., the ability to draw dirt and/or debris into the appliance). For example, when reducing the size of the cyclone, it may be found that the back pressure generated within the cyclone is increased. Increasing back pressure may negatively affect the efficiency of the cyclone and/or may increase power requirements for generating and/or maintaining a desired level of suction. For example, a cyclone may have a diameter of from, e.g., 10 mm up to 20 mm, 30 mm, 40 mm, 50 mm, 50 mm, 60 mm, 70 mm, 80 mm, 90 mm, 100 mm, 110 mm or 120 mm. Accordingly, a cyclone may have a diameter of anywhere from 10 mm-120 mm or any range in between, such as 20 mm-120 mm, 40 mm-100 mm, 50 mm-100 mm, 60 mm-80 mm. Such cyclones will enable a smaller appliance, such as a hand vacuum cleaner, to be designed. However, a hand vacuum cleaner using such cyclones may have increased back pressure and therefore, if cordless, require additional on board energy storage members and/or have a shorter run time between recharging.

In one aspect of this disclosure there is a cyclone that is relatively small and generates relatively low back pressure. That is, the back pressure generated by the cyclone described may be lower than that of an equally sized cyclone known in the art. The back pressure may be reduced by increasing the size of the cyclone air inlet to enable air circulating in the cyclone to extend inwardly from the cyclone sidewall to the inner side of the vortex finder. Accordingly, in a smaller cyclone, the annular flow area of the air may be increased.

In accordance with the aspect, there is provided a surface cleaning apparatus comprising:

(a) an air flow path from a dirty air inlet to a clean air outlet with a cyclone and a motor and fan assembly provided in the air flow path, (b) the cyclone comprising a cyclone axis of rotation centrally positioned in the cyclone and extending between an inlet end of the cyclone and an axially opposed outlet end of the cyclone, a cyclone sidewall extends between the inlet end and the axially opposed outlet end, the inlet end having a cyclone air inlet, the axially opposed outlet end comprising an outlet end wall and a vortex finder extending inwardly into the cyclone, (c) the vortex finder comprising a conduit portion extending inwardly into the cyclone and a screen portion, the conduit portion having an inlet end and an outlet end, and the screen portion extending inwardly into the cyclone from the inlet end of the conduit portion, the conduit portion has a radial width with a radial inner surface and a radial outer surface, wherein, in a plane that is transverse to the cyclone axis of rotation and that extends through the conduit portion, the radial outer surface is located a first radial width from an inner surface of the cyclone sidewall and the radial inner surface is located a second radial width from the inner surface of the cyclone sidewall, and, (d) the cyclone air inlet having an outlet port having has a width in a direction of air rotating in the cyclone, wherein the width has a dimension that is between the first radial width and the second radial width.

In any embodiment, the cyclone may have a diameter of up to 100 mm.

In any embodiment, the vortex finder may have a diameter of 25 mm to 40 mm.

In any embodiment, the cyclone may have a diameter of up to 80 mm and the conduit portion of the vortex finder may have a diameter of up to 40 mm.

In any embodiment, the conduit portion may be tapered, and the first radial width and the second radial width may be at a location that is at the outlet end of the conduit portion.

In any embodiment, the conduit portion may be tapered, and the first radial width and the second radial width may be at a location that is at the inlet end of the conduit portion.

In any embodiment, the conduit portion may be tapered, and the first radial width and the second radial width may be at a location that is at any location of the conduit portion from the inlet end of the conduit portion to the outlet end of the conduit portion.

In any embodiment, the conduit portion may be tapered at an angle of up to 25°, optionally 2°-15°, 3°-9° or 4°-7°.

In any embodiment, the screen may be tapered at an angle of up to 25°, optionally 2°-15°, 3°-9° or 4°-7°.

In any embodiment, the cyclone air inlet may be an axial air inlet, wherein the outlet port is provided in an inlet end wall of the cyclone.

In any embodiment, the cyclone air inlet may be a tangential air inlet wherein the outlet port is provided in the cyclone sidewall.

In any embodiment, the cyclone may have an air flow energy utilization for air flow through the cyclone of 1 CFM, 1.1 CFM, 1.25 CFM, 1.5 CFM, 1.75 CFM, 2 CFM or more per 1 Watt. Optionally,
the cyclone may have a diameter of up to 100 mm and/or, the vortex finder may have a diameter of 25 mm to 40 mm. For example,
the cyclone may have a diameter of up to 80 mm and the conduit portion of the vortex finder may have a diameter of up to 40 mm.

In another aspect of this disclosure, the screen area of a vortex finder in increased by providing a non-porous portion of a vortex finder on the part of the vortex finder that faces a dirt outlet of the cyclone. Accordingly, if the dirt outlet of a cyclone is provided in the cyclone sidewall, then the part of the vortex finder that is aligned with and faces the dirt outlet may be solid while the remainder of the vortex finder angularly spaced around the vortex finder may be porous. Such a design provides a greater flow area through the vortex finder and may reduce the back pressure across the cyclone.

In accordance with the aspect, there is provided a surface cleaning apparatus comprising:

(a) an air flow path from a dirty air inlet to a clean air outlet with a cyclone and a motor and fan assembly provided in the air flow path,
(b) the cyclone comprising a cyclone axis of rotation centrally positioned in the cyclone and extending between an inlet end of the cyclone and an axially opposed outlet end of the cyclone, a cyclone sidewall extends between the inlet end and the axially opposed outlet end, the axially opposed outlet end comprising an outlet end wall and a vortex finder extending inwardly into the cyclone,
(c) the vortex finder comprising a conduit portion extending inwardly into the cyclone and a screen portion, the conduit portion having an inlet end and an outlet end, and the screen portion extending inwardly into the cyclone from the inlet end of the conduit portion, and,
(d) a dirt collection chamber external to the cyclone, the cyclone has a first dirt outlet provided in the cyclone sidewall that is in communication with the dirt collection chamber, the first dirt outlet is located radially outwardly of the conduit portion wherein the conduit portion has a first solid part and a porous part, the first solid part faces the first dirt outlet, and the porous part is positioned angularly around the cyclone axis of rotation from the first dirt outlet.

In any embodiment, the conduit portion may have an axial length that is longer than an axial length of the first dirt outlet.

In any embodiment, the first dirt outlet may extend from a first end angularly around the cyclone sidewall to a second end and the first solid part may extend between 5° and 90° around the cyclone axis of rotation in a first direction from the first end of the first dirt outlet and between 5° and 90° around the cyclone axis of rotation in a second opposed direction from the second end of the first dirt outlet.]\

In any embodiment, the first dirt outlet may extend from a first end angularly around the cyclone sidewall to a second end and the first solid part may extend between 10° and 45° around the cyclone axis of rotation in a first direction from the first end of the first dirt outlet and between 10° and 45° around the cyclone axis of rotation in a second opposed direction from the second end of the first dirt outlet.

In any embodiment, the first dirt outlet may extend from a first end angularly around the cyclone sidewall to a second end and the first solid part may extend between 12° and 30° around the cyclone axis of rotation in a first direction from the first end of the first dirt outlet and between 12° and 30° around the cyclone axis of rotation in a second opposed direction from the second end of the first dirt outlet.

In any embodiment, the first dirt outlet may extend between 30° and 90° angularly around the cyclone sidewall from the first end to the second end.

In any embodiment, the first dirt outlet may extend between 45° and 75° angularly around the cyclone sidewall from the first end to the second end.

In any embodiment, the first porous part may be part of the screen portion.

In any embodiment, the cyclone may have a second dirt outlet, and the conduit portion has a second solid part that faces the second dirt outlet.

In any embodiment, the first dirt outlet may extend in an angular direction from a first end angularly around the cyclone sidewall to a second end, the second dirt outlet may extend in the angular direction from a first end angularly around the cyclone sidewall to a second end, the first porous part may be positioned between the second end of the first dirt outlet and the first end of the second dirt outlet and a second porous part may be positioned between the second end of the second dirt outlet and the first end of the first dirt outlet.

In any embodiment, the second dirt outlet may be on an opposed side of the cyclone from the first dirt outlet.

In any embodiment, a line that extends through the cyclone axis of rotation may extend through each of the first and second dirt outlets.

In any embodiment, the first solid part may extend between 10° and 45° around the cyclone axis of rotation in a first direction from the first end of the first dirt outlet and between 10° and 45° around the cyclone axis of rotation in a second opposed direction from the second end of the first dirt outlet and the second solid part may extend between 10° and 45° around the cyclone axis of rotation in the first direction from the first end of the second dirt outlet and between 10° and 45° around the cyclone axis of rotation in the second opposed direction from the second end of the second dirt outlet.

In any embodiment, the first solid part may extend between 12° and 30° around the cyclone axis of rotation in a first direction from the first end of the first dirt outlet and between 12° and 30° around the cyclone axis of rotation in a second opposed direction from the second end of the first dirt outlet and the second solid part may extend between 12° and 30° around the cyclone axis of rotation in the first direction from the first end of the second dirt outlet and between 12° and 30° around the cyclone axis of rotation in the second opposed direction from the second end of the second dirt outlet.

In any embodiment, each of the first and second dirt outlets may extend between 30° and 90° angularly around the cyclone sidewall from its first end to its second end.

In any embodiment, each of the first and second dirt outlets may extend between 45° and 75° angularly around the cyclone sidewall from its first end to its second end.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
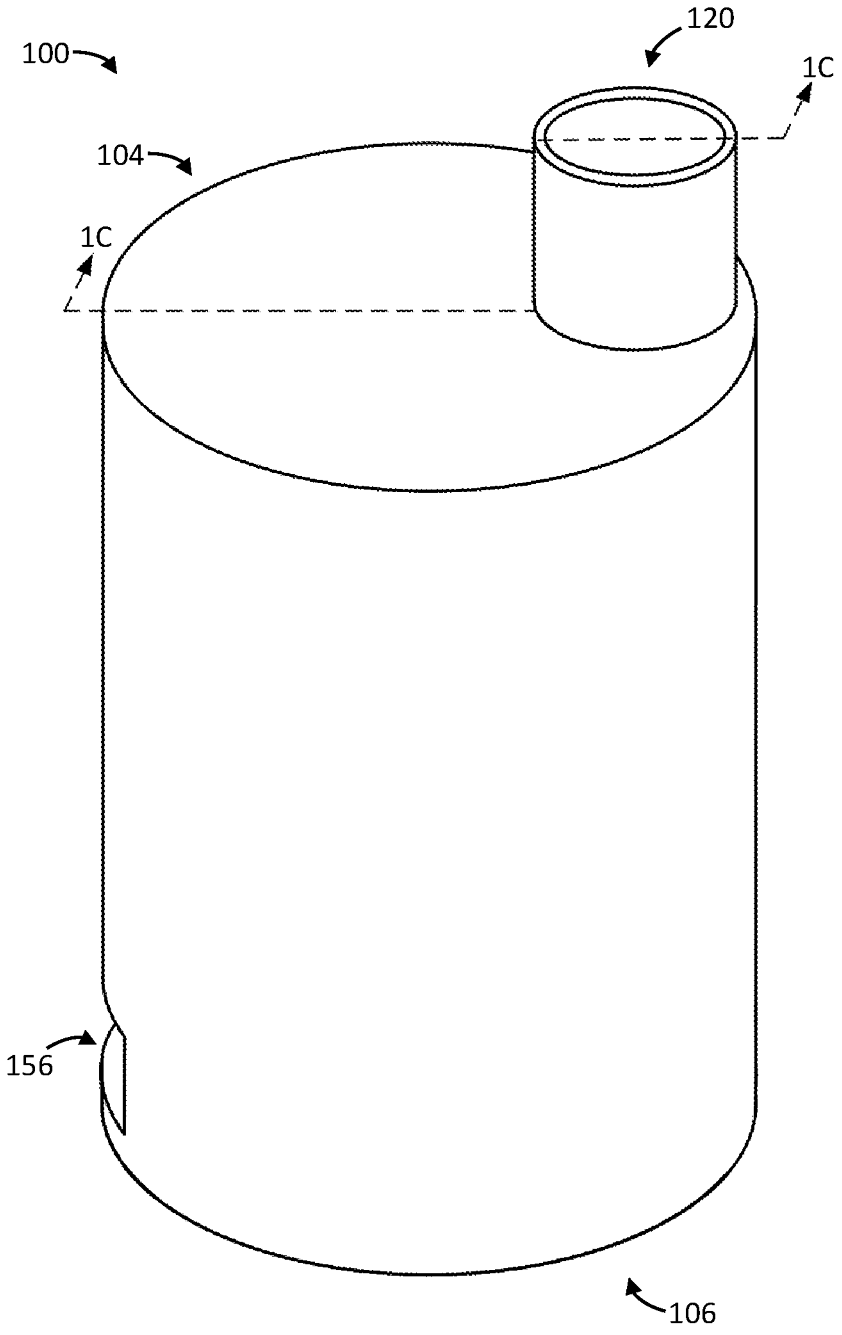
FIG. 1A is a perspective view of a cyclone.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of a Cyclone

Appliances are continuously becoming more versatile while the demand for efficiency and effectiveness remains consistent, if not heightened. For example, in terms of versatility, many vacuum cleaners may be required to operate as both an upright/stick vacuum as well as a handheld vacuum. When operated as an upright/stick vacuum, the air treatment members (cyclones. Filters, etc.) may be relatively large. However, then operated as a handheld vacuum cleaner, the demand is for designs which have a smaller footprint. This requires the use of smaller cyclones. However, in order for the handheld vacuum cleaner to be able to clean an area in the same amount of time, the rate of air flow (CFM) must remain about constant. However, merely proportionately reducing the size of the components of a cyclone (the diameter of the cyclone, the cross-sectional flow area of the cyclone air inlet and the cross-sectional flow area of the cyclone air outlet) while drawing the same amount of air per unit time through the smaller cyclone will increase the back pressure across the cyclone. Accordingly, demand for a cyclone that is power efficient (i.e., reduces the amount of power required for effective separation of dirt and/or debris from and air flow by having a reduced back pressure across the cyclone) is required.

Described herein are cyclones that may generate relatively low back pressure, when in use, compared to that of similarly sized cyclones known in the art. With all other factors remaining the same, by reducing the back pressure through the cyclone, the velocity of an air flow at the dirty air inlet of the appliance may be maintained, thereby maintaining the cleaning efficiency of a vacuum cleaner while using smaller cyclones. That is, described here are cyclones that may increase the cleaning efficiency of an appliance as compared to similarly sized cyclones that are known in the art without increasing the amount of power (e.g., on board energy storage members such as batteries) that is provided.

Referring first to FIG. 1A, shown therein is an example of a cyclone 100. The cyclone 100 may be provided within an appliance between a dirty air inlet and a clean air outlet of the appliance. The cyclone 100 may facilitate separation of dirt and/or debris from an air flow 102 that passes through the appliance from the dirty air inlet to the clean air outlet. A fan and motor assembly may also be provided within the appliance between the dirty air inlet and the clean air outlet for generating the air flow 102. The fan and motor assembly may be of any size and configuration known in the art. The fan and motor assembly may be downstream of the cyclone 100.

Figure 1B:
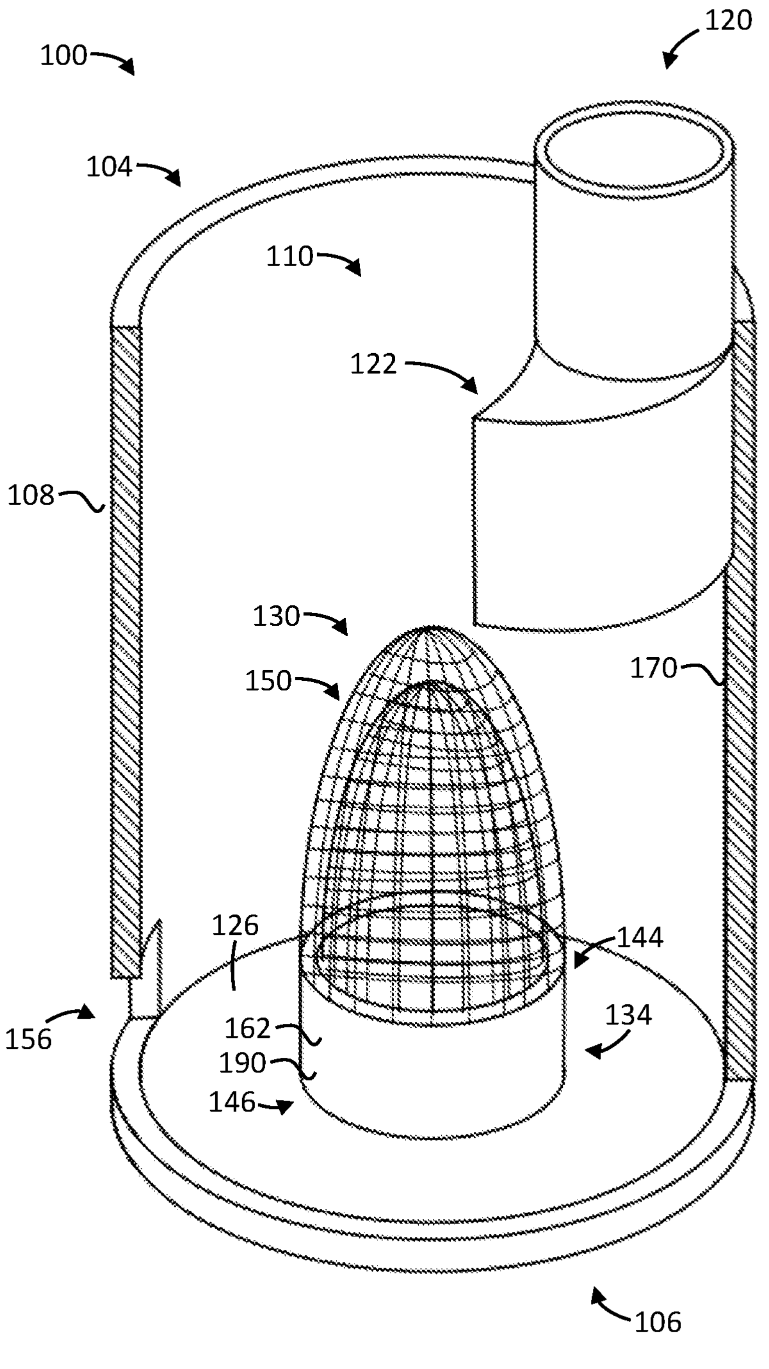
FIG. 1B is a perspective view of the cyclone of FIG. 1A, shown with a portion of the cyclone sidewall removed.
Figure 1C:
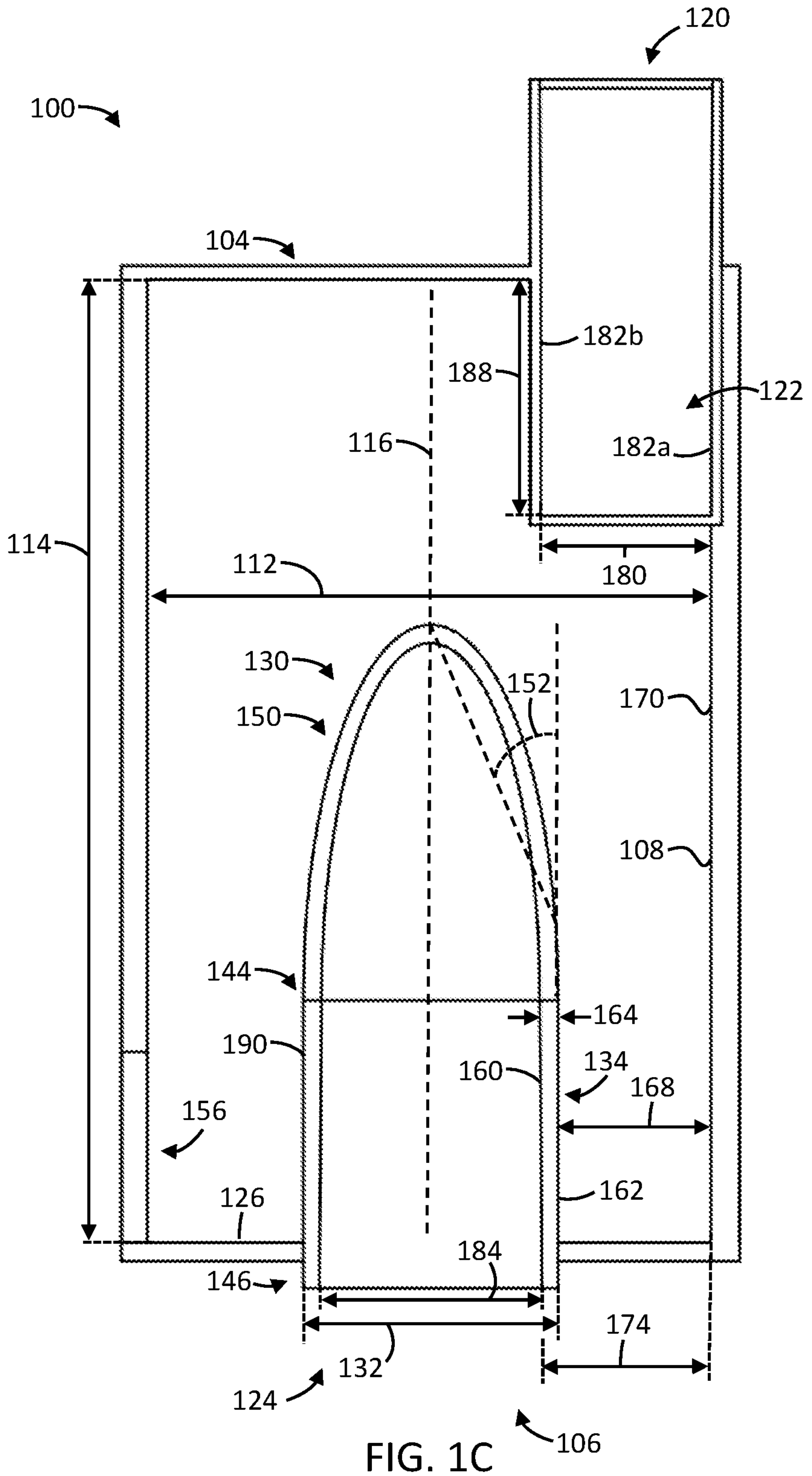
FIG. 1C is a cross-sectional view of the cyclone of FIG. 1A, taken along line 1C-1C.

Referring now to FIG. 1B, in the example illustrated, the cyclone 100 includes an inlet end 104, an outlet end 106, and a cyclone sidewall 108. As exemplified, the cyclone sidewall 108 may extend axially between the inlet end 104 and the outlet end 106. The inlet end 104, the outlet end 106, and the cyclone sidewall 108 may define a cyclone chamber 110. Referring to FIG. 1C, the cyclone chamber 110 has a diameter 112 and a length 114 in the axial direction of the cyclone 100. In some examples, the diameter 112 of the cyclone 100 may be up to 60 mm, 80 mm, 100 mm, or 120 mm. As shown in FIG. 1C, the cyclone 100 may have a cyclone axis of rotation 116 that may be centrally positioned in the cyclone 100 and may extend axially between the inlet end 104 and the outlet end 106.

The outlet end 106 may also include a vortex finder 130 that may surround the cyclone air outlet 124. As shown, the vortex finder 130 may extend inwardly into the cyclone 100. Accordingly, the cyclone air outlet 124 comprises the vortex finder 130 and an outlet port in the end wall of the outlet end 106 of the cyclone. The cyclone air outlet 124 can be of any shape and configuration known in the art.

Figure 2A:
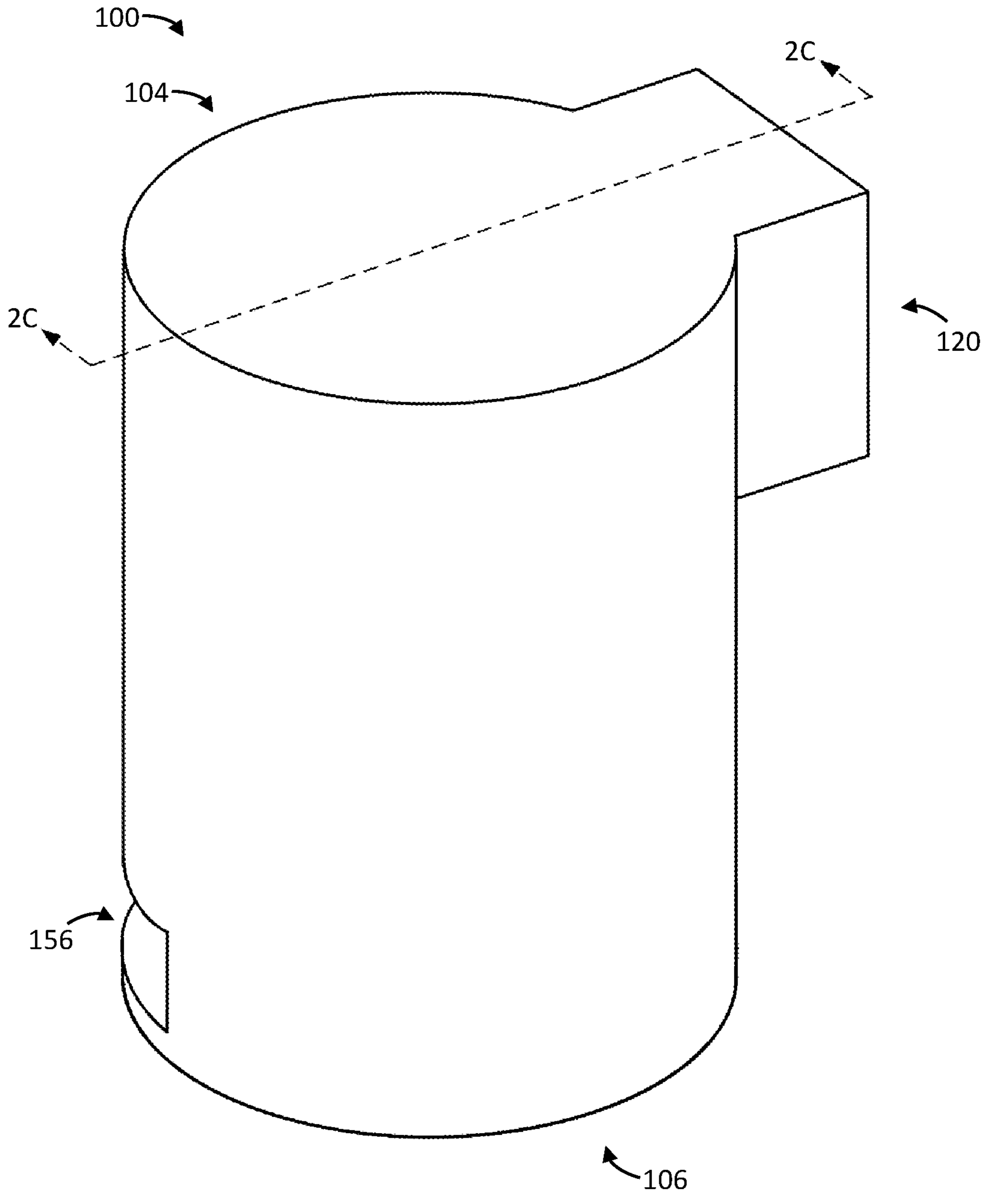
FIG. 2A is a perspective view of another example of a cyclone.

In the example illustrated in FIG. 1B, the inlet end 104 includes a cyclone air inlet 120 through which the air flow (indicated by arrow 102) may enter the cyclone chamber 110. The cyclone air inlet 120 may be of any shape and configuration known in the art. For example, as exemplified in FIG. 1B, the cyclone air inlet 120 may extend axially at the inlet end 104 and may extend through an end wall at the inlet end 104. In other embodiments, see for example FIG. 2A, the cyclone air inlet 120 may enter the cyclone through the cyclone sidewall 108. It will be appreciated that any tangential air inlet may be used.

As exemplified in FIG. 1B, the cyclone air inlet 120 has an outlet port 122 through which the air flow 102 enters the cyclone chamber 110. The outlet port 122 may have any shape and configuration known in the art. The cyclone air inlet 120 may include more than one outlet port 122 (see, for example, FIG. 3C, wherein the inlet is split to provide two tangential flows into the cyclone chamber).

As exemplified in FIG. 1C, the outlet port 122 has a length 188 in the axial direction and a width 180 measured in a direction the air flow 102 rotates in the cyclone (when in use).

The ratio of the length 114 of the cyclone 100 in the axial direction to the length 188 of the outlet port 122 in the axial direction may be from 1.5 to 20, from 2 to 15, from 3 to 8, or from 4 to 6.

The width 180 of the outlet port 122 may be from 10 mm to 100 mm, from 12 mm to 65 mm, from 14 mm to 50 mm, or from 15 mm to 30 mm.

If the cyclone air inlet 120 includes multiple outlet ports 122, the combined widths 180 of those outlet ports 122 may be from 10 mm to 100 mm, from 12 mm to 65 mm, from 14 mm to 50 mm, or from 15 mm to 30 mm.

As exemplified in FIG. 1B, the inlet and the outlet ends 104, 106 are axially spaced apart such that air travels in a single direction along the length of the cyclone from the cyclone air inlet to the cyclone air outlet (a uniflow cyclone). As the air travels from the cyclone air inlet to the cyclone air outlet, the air rotates or cyclones within the cyclone chamber 110. Air that enters a cyclone will tend to remain in a band of air that has a cross-sectional area comparable to the cross-sectional area of the outlet port of the cyclone air inlet. The air will tend to rotate within an annular band. The annular band may have a radial width that is proximate the width 180 of the outlet port 122 and may extend from the cyclone chamber sidewall 108 radially into the cyclone chamber 110.

It will be appreciated that the annular band has a cross-sectional annular flow area in a plane that is transverse to the cyclone axis of rotation. The cross-sectional annular flow area may be from 15:1 to 1:1, from 12:1 to 2:1 or from 6:1 to 3:1 times the cross-sectional area of the cyclone air outlet 124 in a plane that is transverse to the cyclone axis of rotation.

The vortex finder 130 may have any shape and configuration known in the art. In the example illustrated in FIG. 1B, the vortex finder 130 has a circular cross-section. In some examples, the diameter 132 of the vortex finder 130 may be from 25 mm to 40 mm.

Figure 2B:
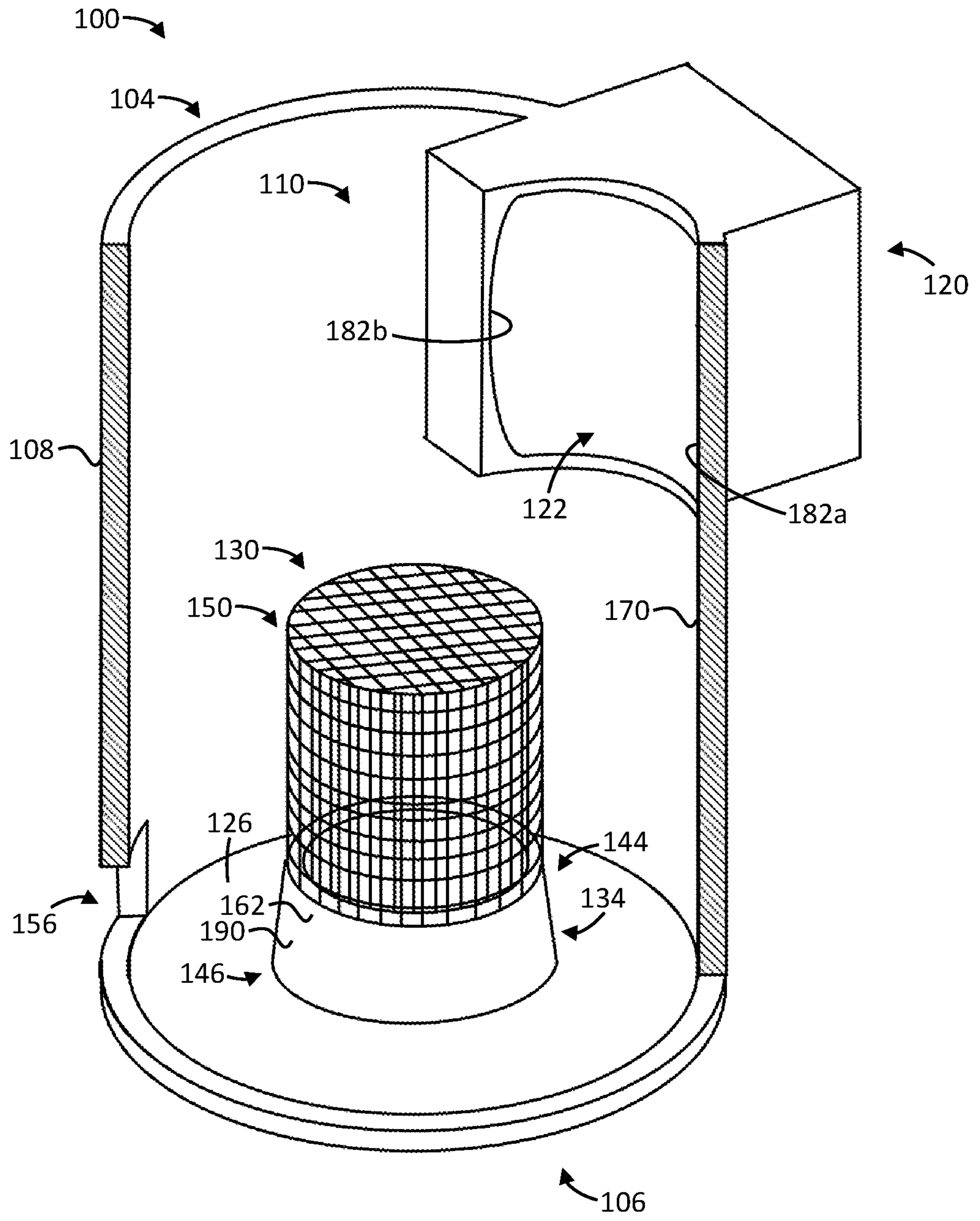
FIG. 2B is a perspective view of the cyclone of FIG. 2A, shown with a portion of the cyclone sidewall removed.
Figure 2C:
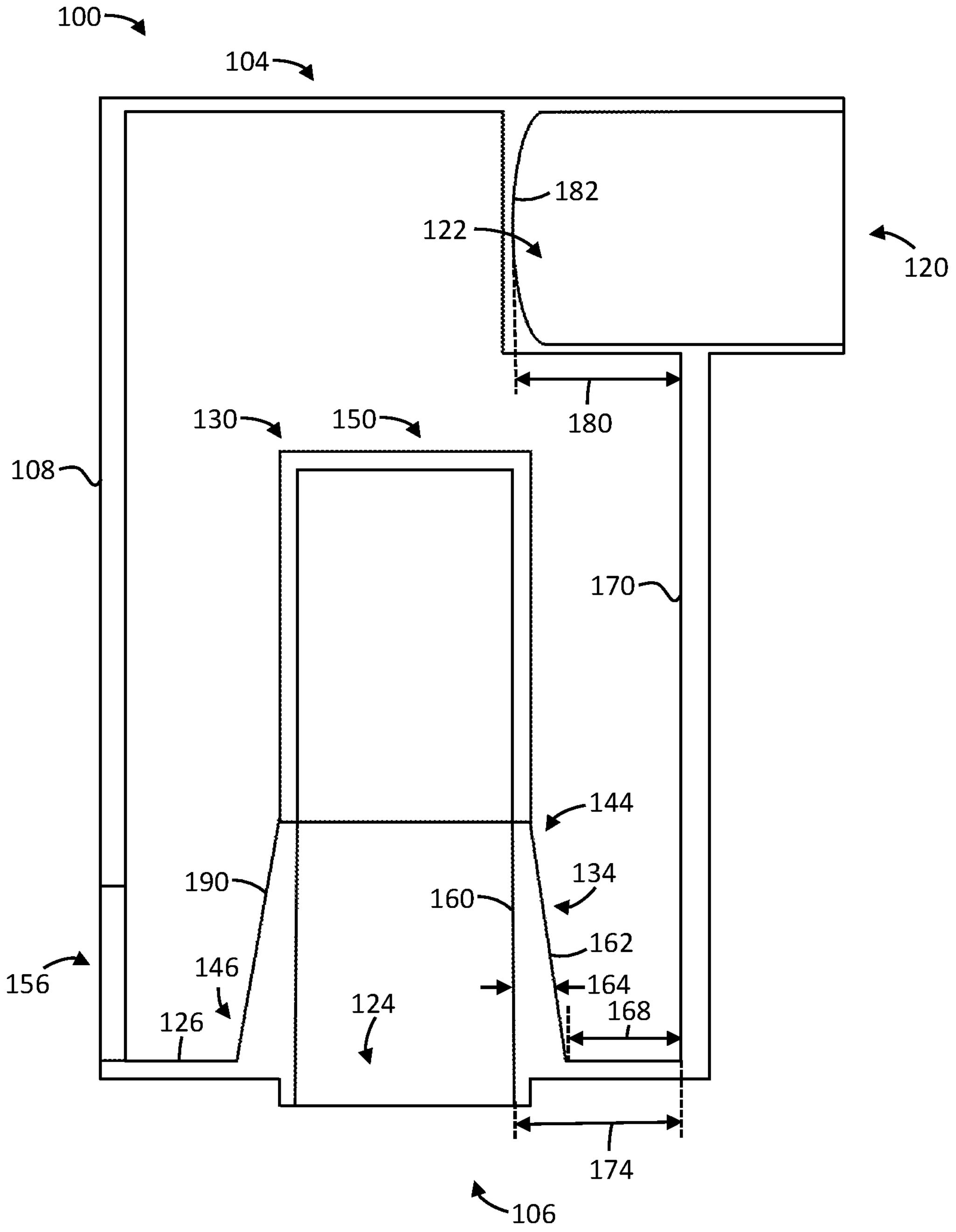
FIG. 2C is a cross-sectional view of the cyclone of FIG. 2A, taken along line 2C-2C.
Figure 3A:
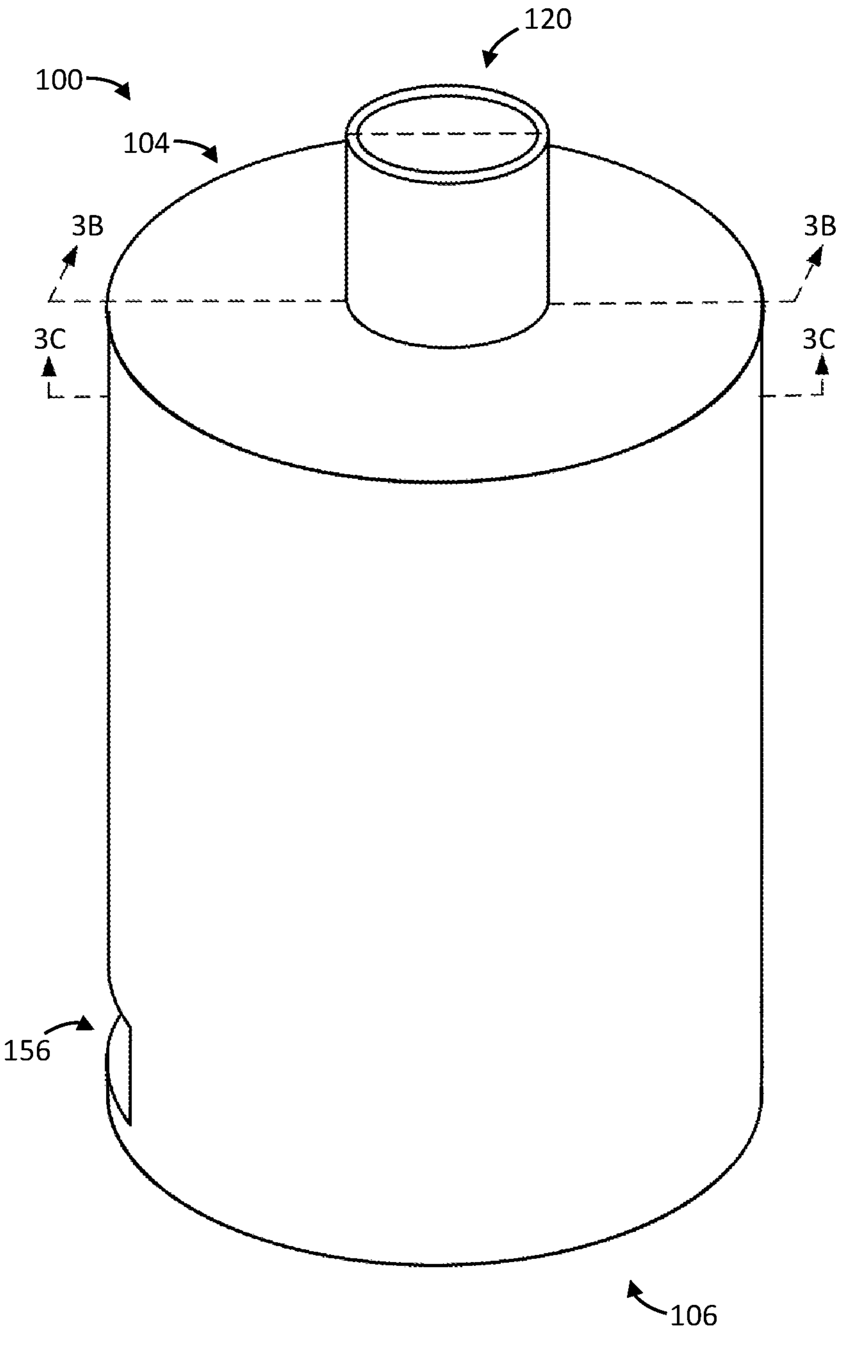
FIG. 3A is a perspective view of another example of a cyclone.
Figure 3B:
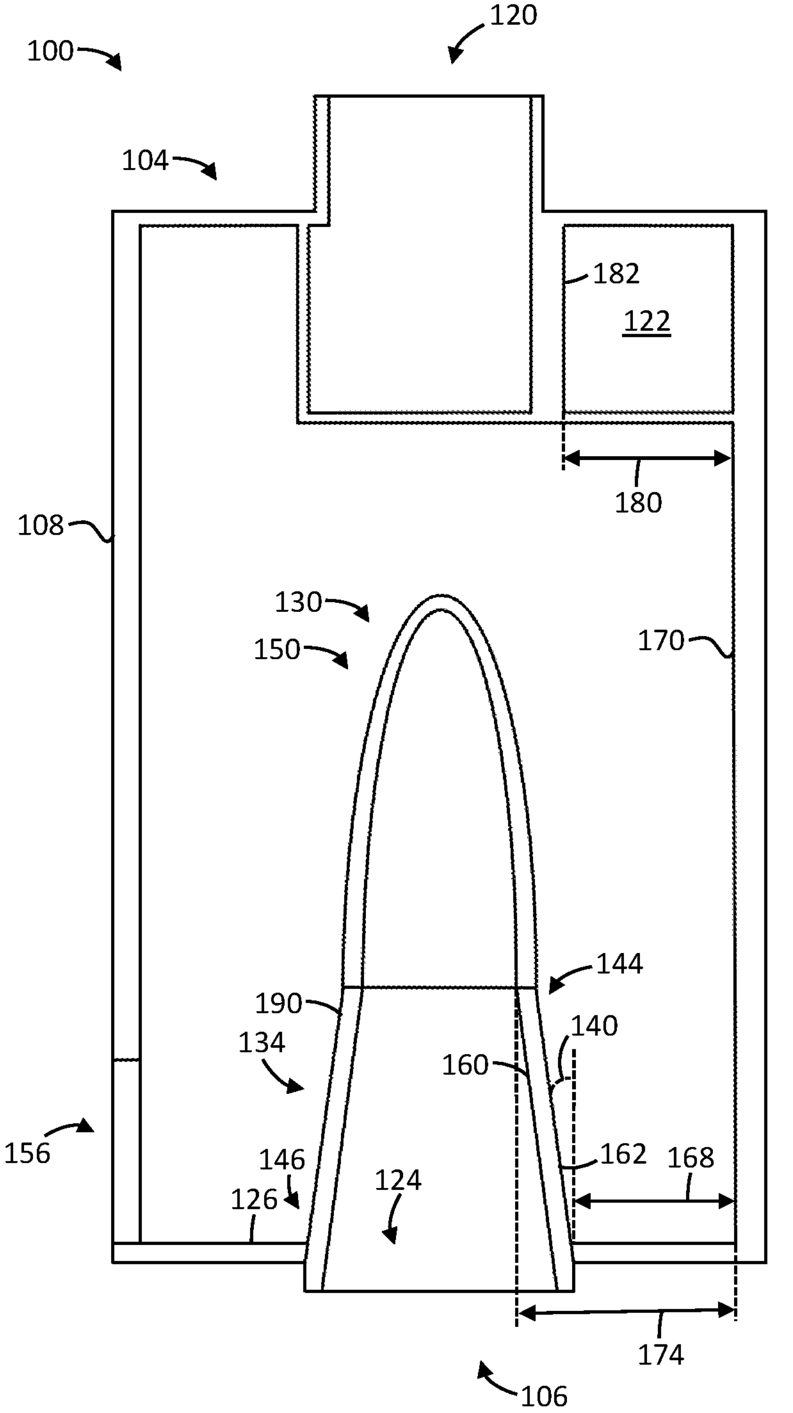
FIG. 3B is a cross-sectional view of the cyclone of FIG. 3A, taken along line 3B-3B.

In the example illustrated in FIG. 1C, the vortex finder 130 includes a conduit portion 134. The conduit portion 134 may be of any shape and configuration known in the art and may extend inwardly into the cyclone chamber 110. As exemplified, all of the conduit portion 134 may be solid (i.e., air impermeable or non-porous) For example, the conduit portion 134 illustrated in FIG. 1C is linear (cylindrical), whereas the conduit portion 134 illustrated in FIGS. 2C and 3B is tapered (frusto-conical). In some examples, the conduit portion 134 may be tapered at an angle 140 of up to 25°, optionally from 2° to 15°, from 3° to 9°, or from 4° to 7°.

As shown, the conduit portion 134 may have an inlet end 144 and an outlet end 146. The outlet end 146 of the conduit portion 134 may be joined (e.g., glued, welded, etc.) to the end wall 126 of the outlet end 106. Alternatively, the conduit portion 134 may be an integral component of the end wall 126 of the outlet end 106 (i.e., in some examples, the end wall 126 of the outlet end 106 and the conduit portion 134 may be formed from the same work piece).

In the example illustrated in FIG. 1C, the vortex finder 130 also includes a screen portion 150. The screen portion 150 may have any shape and configuration known in the art. For example, the screen portion 150 may be tapered as shown in FIG. 1C. As a second example, the screen portion 150 may be linear, as shown in FIG. 2C.

The screen portion 150 may have a length in the axial direction which is equal to the length 188 in the axial direction of the outlet port 122 of the cyclone air inlet 120. Alternatively, the length of the screen portion 150 in the axial direction may be from 1 to 10 times, from 1.25 to 8 times, from 1.5 to 6 times, from 1.5 to 4 times, from 2 to 6 times, or from 2 to 4 times the length 188 of the outlet port 122 in the axial direction.

When tapered, the screen portion 150 may be tapered at an angle 152 of up to 25°, optionally from 2° to 15°, from 3° to 9°, or from 4° to 7°. As shown, the screen portion 150 may extend inwardly into the cyclone chamber 110 from the inlet end 144 of the conduit portion 134.

Figure 4A:
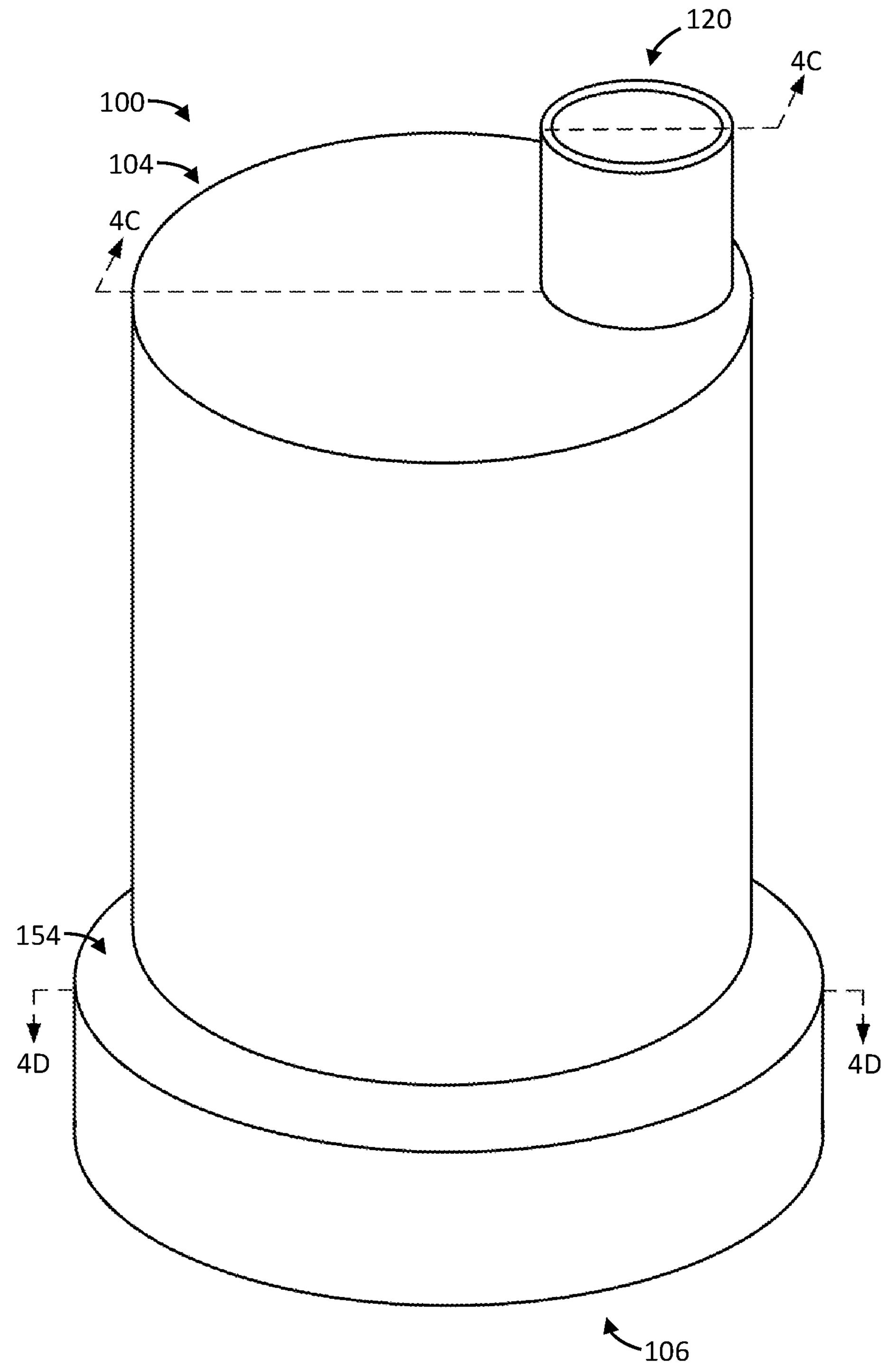
FIG. 4A is a perspective view of another example of a cyclone.

The appliance may also include a dirt collection chamber 154. The dirt collection chamber 154 may have any shape and configuration known in the art. In some examples, the dirt collection chamber 154 is within the cyclone 100. In other examples, as exemplified in FIG. 4A, the appliance may include a dirt collection chamber 154 that is external to the cyclone 100. As shown, the dirt collection chamber 154 may extend outwardly and below the cyclone 100. As shown more clearly in FIGS. 4C and 4D, the cyclone 100 may include a dirt outlet 156 that is in communication with the dirt collection chamber 154. The dirt outlet 156 may have any shape or configuration known in the art. The length 196 of the dirt outlet 156 in the axial direction may be from 2 mm to 35 mm, from 4 mm to 25 mm, from 6 mm to 19 mm, or from 12 mm to 17 mm. In the example illustrated, the dirt outlet 156 is provided in the cyclone sidewall 108 of the cyclone 100.

The surface area of the screen 150 may be from 1 to 20, from 2 to 15, from 3 to 8 or from 3.5 to 5 times the cross-sectional area of the outlet port 122.

Optionally, the surface area of the screen 150 may be the same as or larger than one or more of the cross-sectional flow area of the inlet conduit extending the cyclone air inlet (in a plane transverse to a direction of flow through the conduit), the cross-sectional area of the outlet port 122 and the cross-sectional area of the cyclone outlet (conduit portion 134) in a plane transverse to the cyclone axis of rotation.

Optionally, the surface area of the screen 150 may be the larger than the cross-sectional flow area of the inlet conduit extending the cyclone air inlet (in a plane transverse to a direction of flow through the conduit), and the cross-sectional flow area of the inlet conduit may be the same as or larger than the cross-sectional area of the outlet port 122 and the cross-sectional area of the cyclone outlet (conduit portion 134) in a plane transverse to the cyclone axis of rotation.

Optionally, the surface area of the screen 150 may be the larger than the cross-sectional area of the outlet port 122, the cross-sectional area of the outlet port 122 may be larger than the cross-sectional flow area of the inlet conduit extending the cyclone air inlet (in a plane transverse to a direction of flow through the conduit), and the cross-sectional flow area of the inlet conduit may be the same as or larger than the cross-sectional area of the cyclone outlet (conduit portion 134) in a plane transverse to the cyclone axis of rotation.

Optionally, the cross-sectional area of the outlet port 122 may be larger than one or more of the cross-sectional flow area of the inlet conduit extending the cyclone air inlet (in a plane transverse to a direction of flow through the conduit), the surface area of the screen 150 the cross-sectional area of the cyclone outlet (conduit portion 134) in a plane transverse to the cyclone axis of rotation.

General Description of a Cyclone Air Inlet and Vortex Finder Arrangement

In accordance with one aspect of this disclosure, which may be used by itself or in combination with any other aspect of this disclosure, the size and position of the cyclone air inlet 120 relative to the size and position of the vortex finder 130 may be adjusted to increase the cross-sectional area of the annular band in which the air rotates, in a plane transverse to the cyclone axis of rotation.

Referring to FIG. 1C, in the example illustrated, the conduit portion 134 has a radial inner surface 160 and a radial outer surface 162. The radial inner surface 160 and radial outer surface 162 of the conduit portion 134 define a radial width 164 of the conduit portion 134. In the example illustrated, the radial width 164 is constant between the inlet end 144 of the conduit portion 134 and the outlet end 146 of the conduit portion 134. In other examples, the radial width 164 may not be constant between the inlet end 144 of the conduit portion 134 and the outlet end 146 of the conduit portion 134 (see, for example, FIG. 2C).

In the example illustrated in FIG. 1C, in a plane that is transverse to the cyclone axis of rotation 116 and that extends through the conduit portion 134, the radial outer surface 162 of the conduit portion 134 of the vortex finder 130 is located a first radial width 168 from an inner surface 170 of the cyclone sidewall 108. As shown in FIG. 1C, the radial inner surface 160 of the conduit portion 134 of the vortex finder 130 is located a second radial width 174 from the inner surface 170 of the cyclone sidewall 108.

In some examples, the vortex finder 130 may be tapered (see, for example, FIGS. 2C and 3B). When the vortex finder 130 is tapered, the distance between the radial outer surface 162 of the conduit portion 134 and the inner surface 170 of the cyclone sidewall 108 and/or the distance between the radial inner surface 160 of the conduit portion 134 and the inner surface 170 of the cyclone sidewall 108 may vary along the length of the conduit portion 134 in the axial direction. Accordingly, in such a case, the first radial width 168 may be defined as the minimum distance between the radial outer surface 162 of the conduit portion 134 and the inner surface 170 of the cyclone sidewall 108 (see, for example, FIG. 3B). The second radial width 174 may be defined as the maximum distance between the radial inner surface 160 of the conduit portion 134 and the inner surface 170 of the cyclone sidewall 108 (see, for example, FIG. 3B).

Generally, the vortex finder 130 of a cyclone 100 is centered within the cyclone 100 as this may promote the formation of a cyclone within the cyclone chamber 110 when the air flow 102 passes from the cyclone air inlet 120 to the cyclone air outlet 124. Accordingly, the first and second radial widths 168, 174 may be the same at all locations around the vortex finder 130.

Figure 3C:
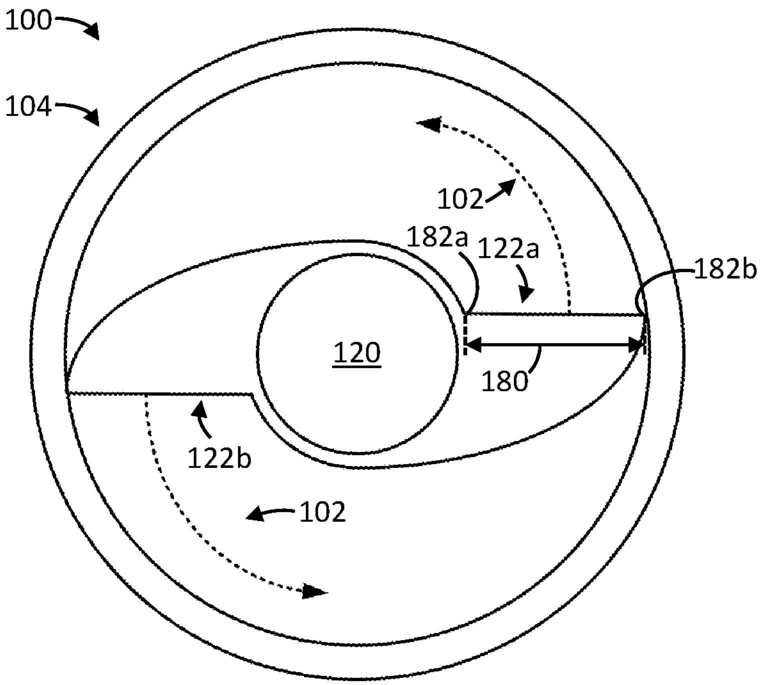
FIG. 3C is a cross-sectional view of the cyclone of FIG. 3A, taken along line 3C-3C.

The air that enters the cyclone chamber 110 has a width that is determined by the width 180 of the outlet port 122 of the cyclone air inlet 120. The width 180 is measured from a first side 182*a* of the inlet port to a second side 182*b* of the inlet port 122 in a plane that is transverse to the cyclone axis of rotation. Accordingly, as exemplified in FIGS. 1C, 2B and 4C, the width 180 may be measured in a direction the air flow 102 rotates in the cyclone 100 (when in use). In the embodiment of FIG. 3C, the width is measured in the radial direction from the radial inner first surface 182*a* to the radial outer second surface 182*b*.

As illustrated in FIGS. 1C, 2C, and 3B, the width 180 of the outlet port 122 of the cyclone air inlet 120 may have a dimension that is between the first radial width 168 and the second radial width 174. That is, for example, if the first radial width 168 is 20 mm and the second radial width 174 is 22 mm, the width 180 of the outlet port 122 of the cyclone air inlet 120 may be from 20 mm to 22 mm, e.g., 21 mm.

Prior to this disclosure, in the cyclone art, it was generally understood that for optimal performance of a cyclone, the width 180 of the outlet port 122 of the cyclone air inlet 120 should be less than the first radial width 168. However, it has been determined that by increasing the width 180 of the outlet port 122 of the cyclone air inlet 120 such that the width 180 has a dimension that is from the first radial width 168 to the second radial width 174 the back pressure across the cyclone may be reduced without the separation efficiency of the cyclone 100 may not be negatively impacted.

Understanding that the outlet port 122 of the cyclone air inlet 120 can have a width 180 that is between the first radial width 168 and the second radial width 174 without negatively affecting performance of the appliance may positively affect cyclone design, and appliance design. That is, by increasing the width 180 of the outlet port 122 of the cyclone air inlet 120 such that it is between the first radial width 168 and the second radial width 174, the overall size of the cyclone 100 may be reduced without sacrificing performance.

For example, a cyclone 100 known in the art prior to this disclosure may have a diameter 112 of 60 mm and the vortex finder 130 may have a conduit portion 134 with inner diameter 184 of 30 mm and an outer diameter (i.e., the diameter 132 of the vortex finder 130) of 34 mm (i.e., the conduit portion 134 may have a radial width 164 of 2 mm). Accordingly, in this example, the first radial width 168 would be 13 mm (provided the vortex finder 130 is centered within the cyclone 100) and the second radial width 174 would be 15 mm. As stated above, conventional cyclone design suggests that the width 180 of the outlet port 122 of the cyclone air inlet 120 should therefore be up to 13 mm (i.e., less than the first radial width 168). Accordingly, if the outlet area of the outlet port 122 of the cyclone air inlet 120 is to be, for example, 700 $mm^2$, the outlet port 122 of the cyclone air inlet 120 may have a width 180 of 13 mm and a height 188 of approximately 53.8 mm.

In contrast, accordingly to the cyclone air inlet 120 and vortex finder 130 arrangement described herein, the cyclone air inlet 120 and the vortex finder 130 may be kept the same size, but the diameter 112 of the cyclone 100 may be decreased by 4 mm without sacrificing any performance characteristics by overlapping the outlet port 122 of the cyclone air inlet 120 with the radial width 164 of the conduit portion 134 of the vortex finder 130. That is, the cyclone 100 may have a diameter 112 of 56 mm and the vortex finder 130 may have a conduit portion 134 with an inner diameter 184 of 30 mm and an outer diameter (i.e., the diameter 132 of the vortex finder 130) of 34 mm. The outlet port 122 of the cyclone air inlet 120 may have a width 180 of 13 mm and a height 188 of approximately 53.8 mm.

In this example, by resizing the outlet port 122 of the cyclone air inlet 120 relative to the vortex finder 130 such that the width 180 of the outlet port 122 is between the first radial width 168 and the second radial width 174, the diameter 112 of the cyclone 100 may be reduced by 6.67%. Accordingly, by providing a cyclone air inlet 120 having an outlet port 122 with a width 180 in a direction of air rotating in the cyclone chamber 110 that is a dimension between the first radial width 168 and the second radial width 174, the overall size of the cyclone 100 can be reduced without limiting the performance characteristics of the cyclone 100.

It has been found that when the width 180 of the outlet port 122 it is between the first radial width 168 and the second radial width 174 the air flow energy utilization may be 1.1 CFM per 1 Watt, 1.25 CFM per 1 Watt, or more.

It will be appreciated that the relative sizing of the outlet port 122 and the cortex finder is optionally used in a uniflow cyclone as exemplified herein.

General Description of a Vortex Finder with Increased Screen Surface Area

In accordance with one aspect of this disclosure, which may be used by itself or in combination with any other aspect of this disclosure, the surface area of the screen portion 150 may be increased without increasing the surface area of the vortex finder 130, itself by reducing the angular extent of the solid portion of the outlet conduit 134.

The surface area of the screen portion 150 relative to an outlet area of the outlet port 122 of the cyclone air inlet 120 may have an effect on the performance characteristics of the appliance. For example, if the surface area of the screen portion 150 is less than the outlet area of the outlet port 122, the cyclone 100 may produce an undesirable amount of back pressure. As a result, it may be desirable for the surface area of the screen portion 150 to be equal to or greater than the outlet area of the outlet port 122. Optionally, the ratio of the surface area of the screen portion to the outlet area of the outlet port 122 may be between 1:1 and 20:1, or between 2:1 and 15:1, or between 3:1 and 8:1, or between 3.5:1 and 5:1.

It is to be understood that if the cyclone air inlet 120 includes multiple outlet ports 122, the outlet area of the outlet port 122 is the combined outlet area of each outlet port 122. For example, referring to FIGS. 3B and 3C, in the example illustrated the cyclone air inlet 120 includes a first outlet port **122*a* and a second outlet port 122*b*. Accordingly, it may be desirable for the surface area of the screen portion 150 to be equal to or greater than the outlet area of the first outlet port 122*a* and the outlet area of the second outlet port 122*b***, combined.

It may be desirable to increase the surface area of the screen portion 150 without increasing the surface area of the vortex finder 130 itself, as a larger vortex finder 130 may require a larger cyclone 100; which, as previously discussed, may be undesirable. In addition, it may be undesirable to decrease the outlet area of the outlet port 122 of the cyclone air inlet 120 so that the surface area of the screen portion 150 is greater than or equal to the outlet area of the outlet port 122 as reducing the outlet area of the outlet port 122 will reduce the rate of air flow into the cyclone without increasing the power input to the suction motor.

Accordingly, it may be desirable to increase the surface area of the screen portion 150 without increasing the surface area of the vortex finder 130 as this may allow for the size of the cyclone 100 to be reduced without giving up performance.

To increase the surface area of the screen portion 150 without increasing the surface area of the vortex finder 130, the surface area of the conduit portion 134, specifically the surface area of a solid part 190 of the conduit portion 134, may be reduced. Reducing the surface area of the solid part 190 of the conduit portion 134 may be accomplished by any means known in the art. For example, a length 194 of the solid part 190 of the conduit portion 134 in the axial direction may be reduced. As a second example, the conduit portion 134 may be provided with a porous part 192.

The porous part 192 of the conduit portion 134 may be formed by any means known in the art so long as the porous part 192 of the conduit portion 134 allows the air flow 102 to pass therethrough. Accordingly, the porous part 192 of the conduit portion 134 may include holes punched into the conduit portion 134. That is, the solid part 190 and the porous part 192 of the conduit portion 134 may be made of a single work piece. Alternatively, the porous part 192 of the conduit portion 134 may be a continuation of the screen portion 150 (see, for example, FIG. 4B).

Figure 4B:
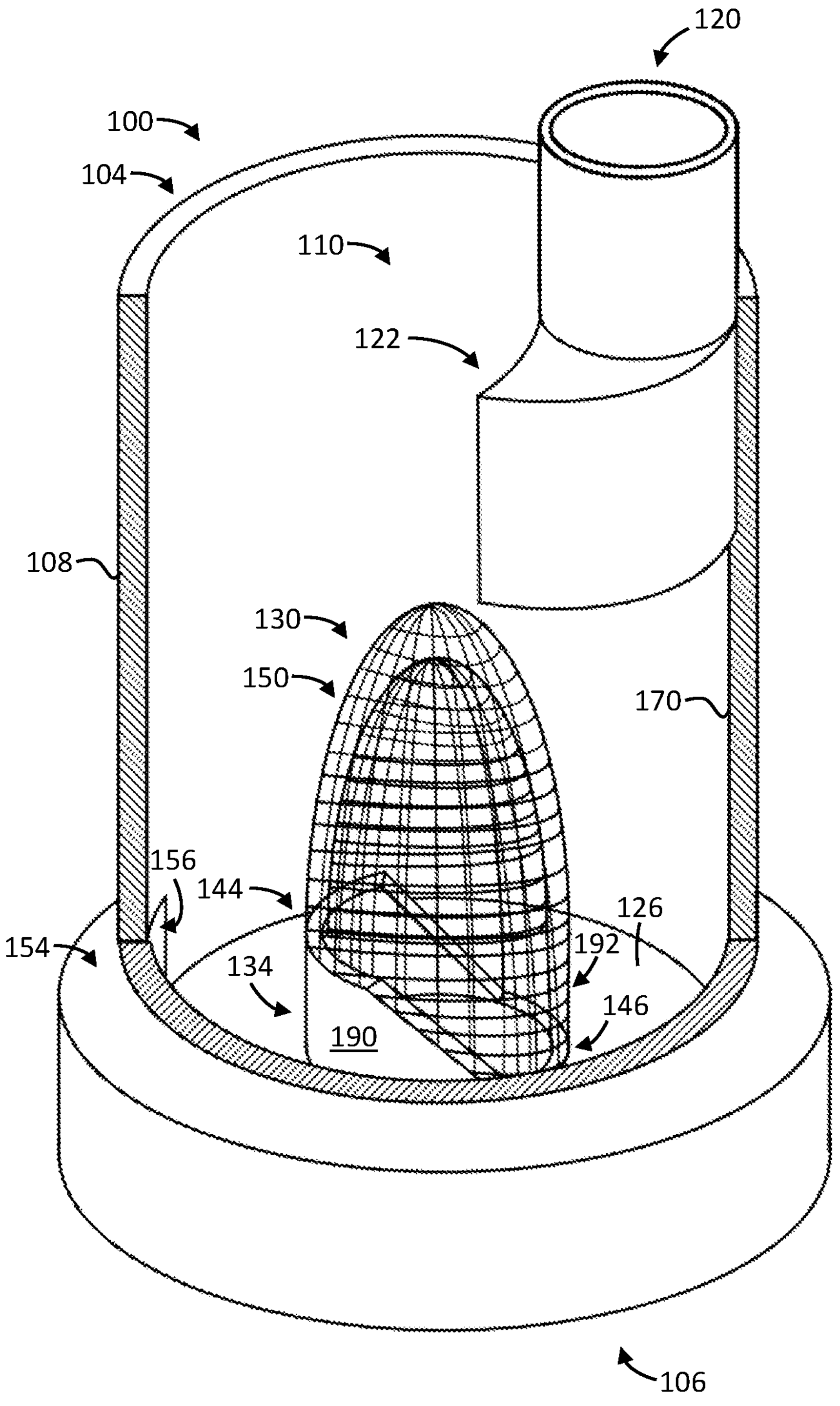
FIG. 4B is a perspective view of the cyclone of FIG. 4A, shown with a portion of the cyclone sidewall removed.

In accordance with this aspect, the solid part 190 is spaced from and faces the dirt outlet 156, as is shown in FIG. 4B. Accordingly, a plane that is transverse to the cyclone axis of rotation will extend through the dirt outlet 156, the solid part 190 and the porous portion that is angularly spaced around the cyclone axis of rotation from the dirt outlet 156.

Figure 4C:
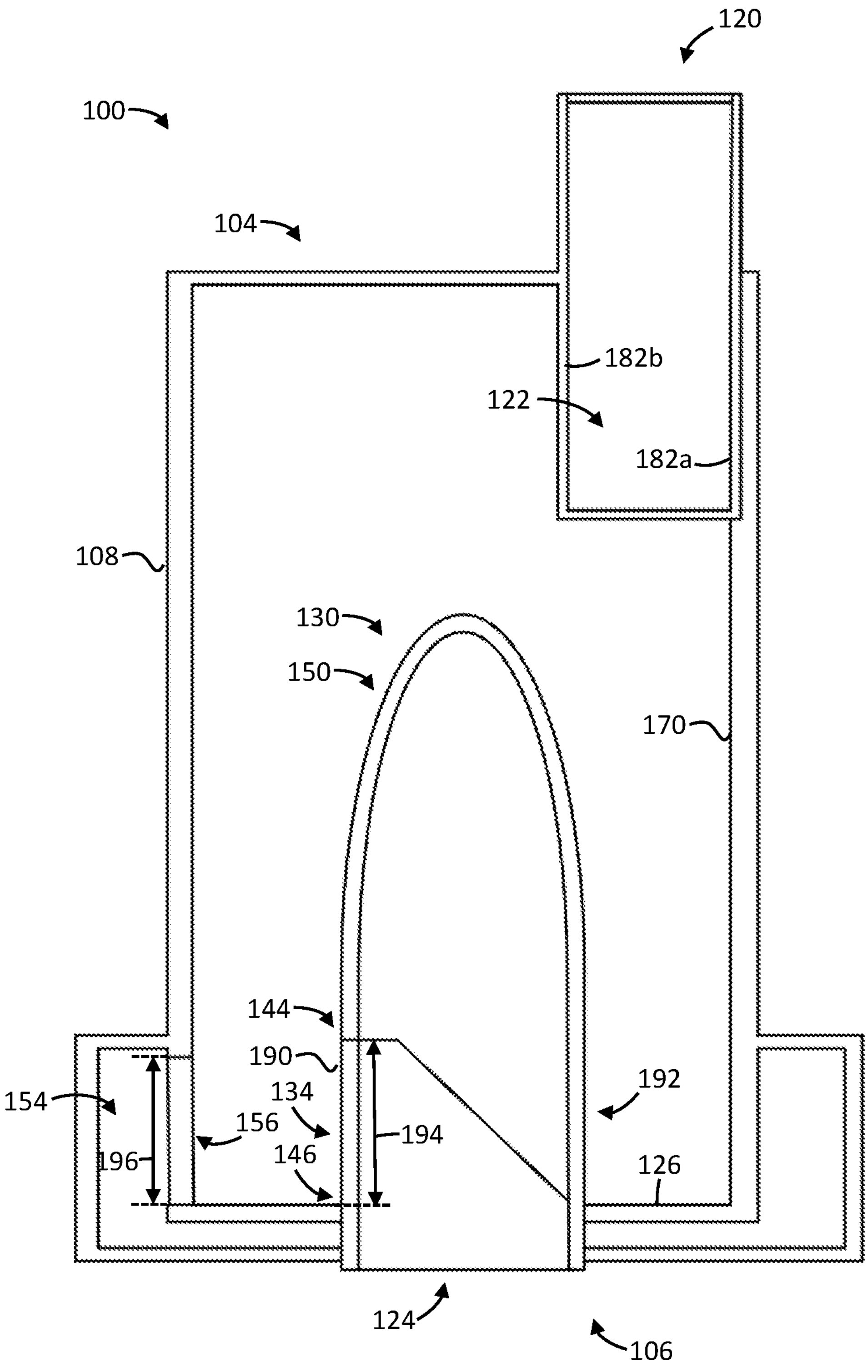
FIG. 4C is a cross-sectional view of the cyclone of FIG. 4A, taken along line 4C-4C.

As exemplified in FIG. 4C, the conduit portion 134 may have an axial length 194 that is longer than an axial length 196 of the dirt outlet 156. For example, the axial length 194 of the conduit portion 134 may be from 1 mm to 3 mm longer than the axial length 196 of the dirt outlet 156.

Figure 4D:
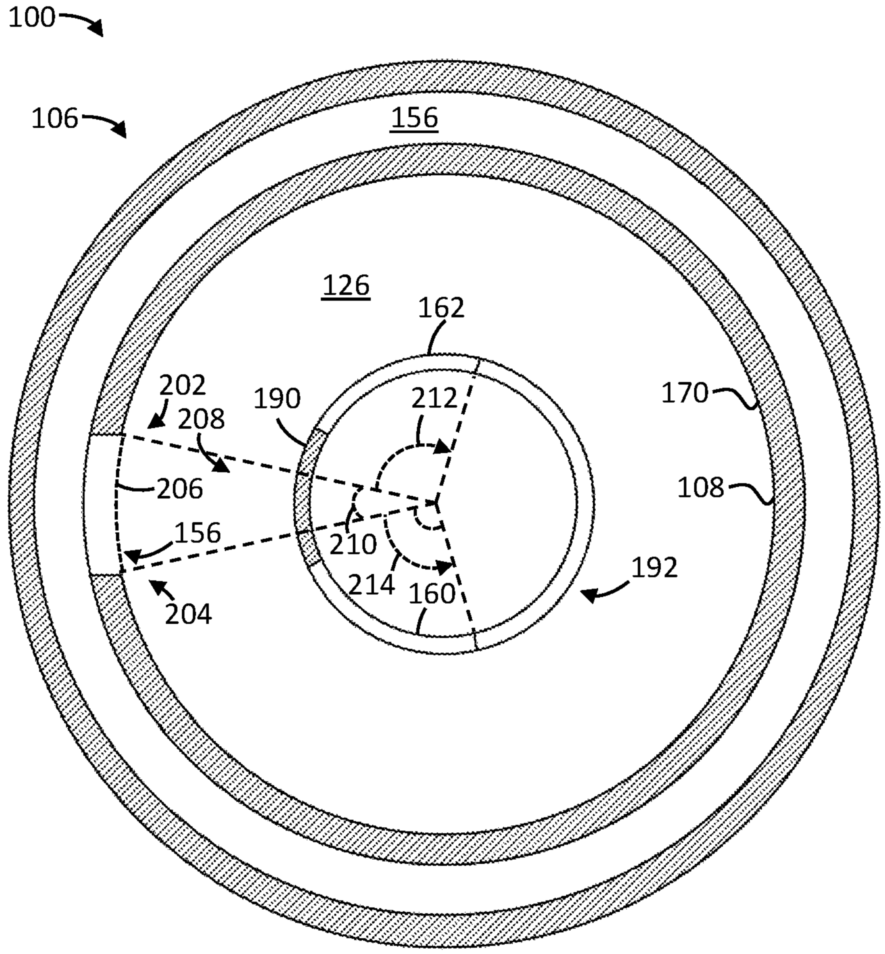
FIG. 4D is a cross-sectional view of the cyclone of FIG. 4A, taken along line 4D-4D.

Referring now to FIG. 4D, in the example illustrated, the dirt outlet 156 extends from a first end 202 angularly around the cyclone sidewall 108 to a second end 204. Accordingly, as shown, the dirt outlet 156 has an arc length 206 defining a section 208 of the cyclone 100 and a dirt outlet sector angle 210. In some examples, the dirt outlet sector angle 210 can be from 30° to 90°, or more particularly from 45° to 75°.

Optionally, the solid portion 190 has an angular length (or arc length) that is at least the arc length 206 of the dirt outlet and, optionally is larger. As exemplified in FIG. 4D, the solid part 190 may have a sector angle from 5° to 90°, from 10° to 45°, or from 12° to 30° around the cyclone axis of rotation 116 in a first direction 212 from the first end 202 of the dirt outlet 156 and/or a sector angle of from 5° to 90°, from 10° to 45°, or from 12° to 30° around the cyclone axis of rotation 116 in a second opposed direction 214 from the second end 204 of the dirt outlet 156. As exemplified in FIG. 4D, the solid part 190 extends 90° around the cyclone axis of rotation 116 in the first direction 212 from the first end 202 of the dirt outlet 156 and 90° around the cyclone axis of rotation 116 in the second opposed direction 214 from the second end 204 of the dirt outlet 156.

Figure 5A:
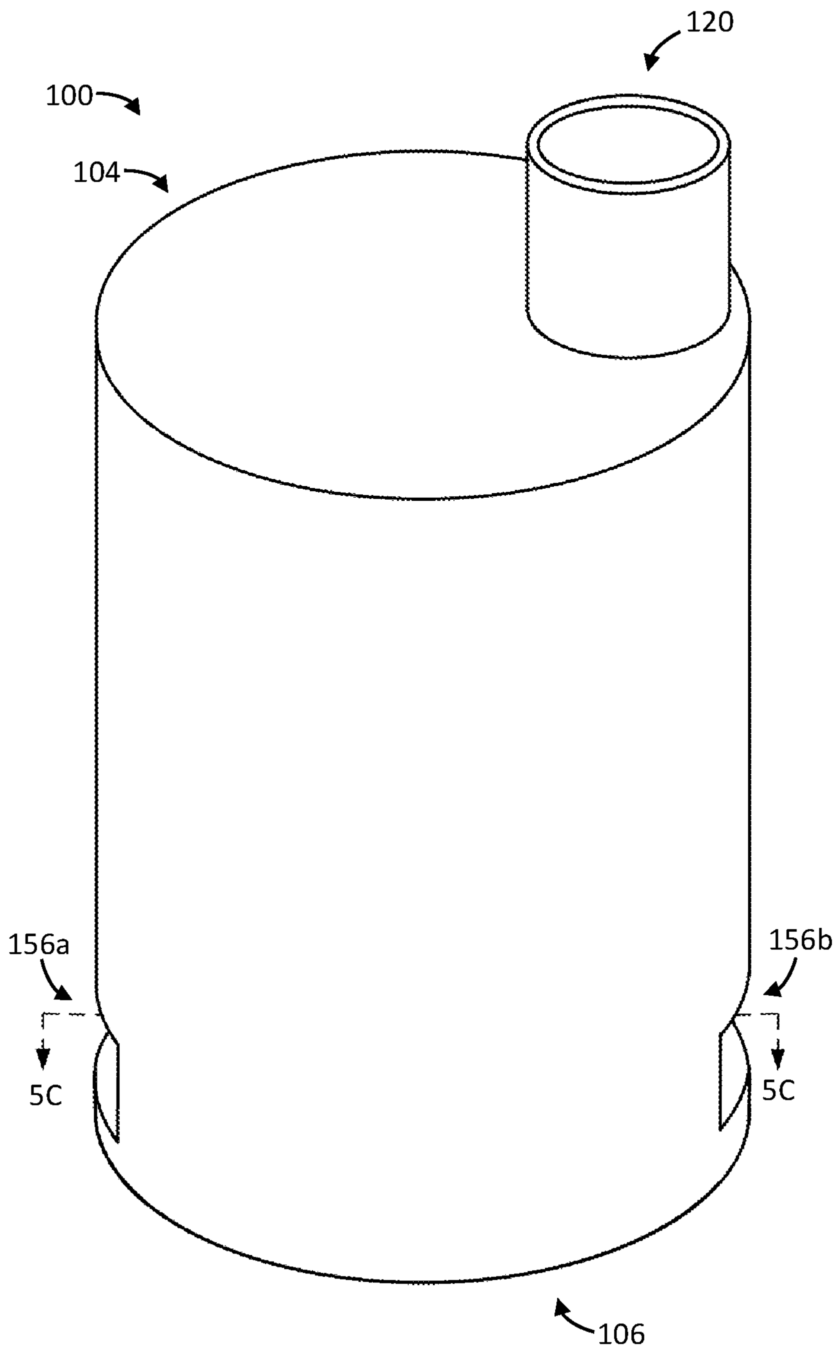
FIG. 5A is a perspective view of another example of a cyclone.
Figure 5B:
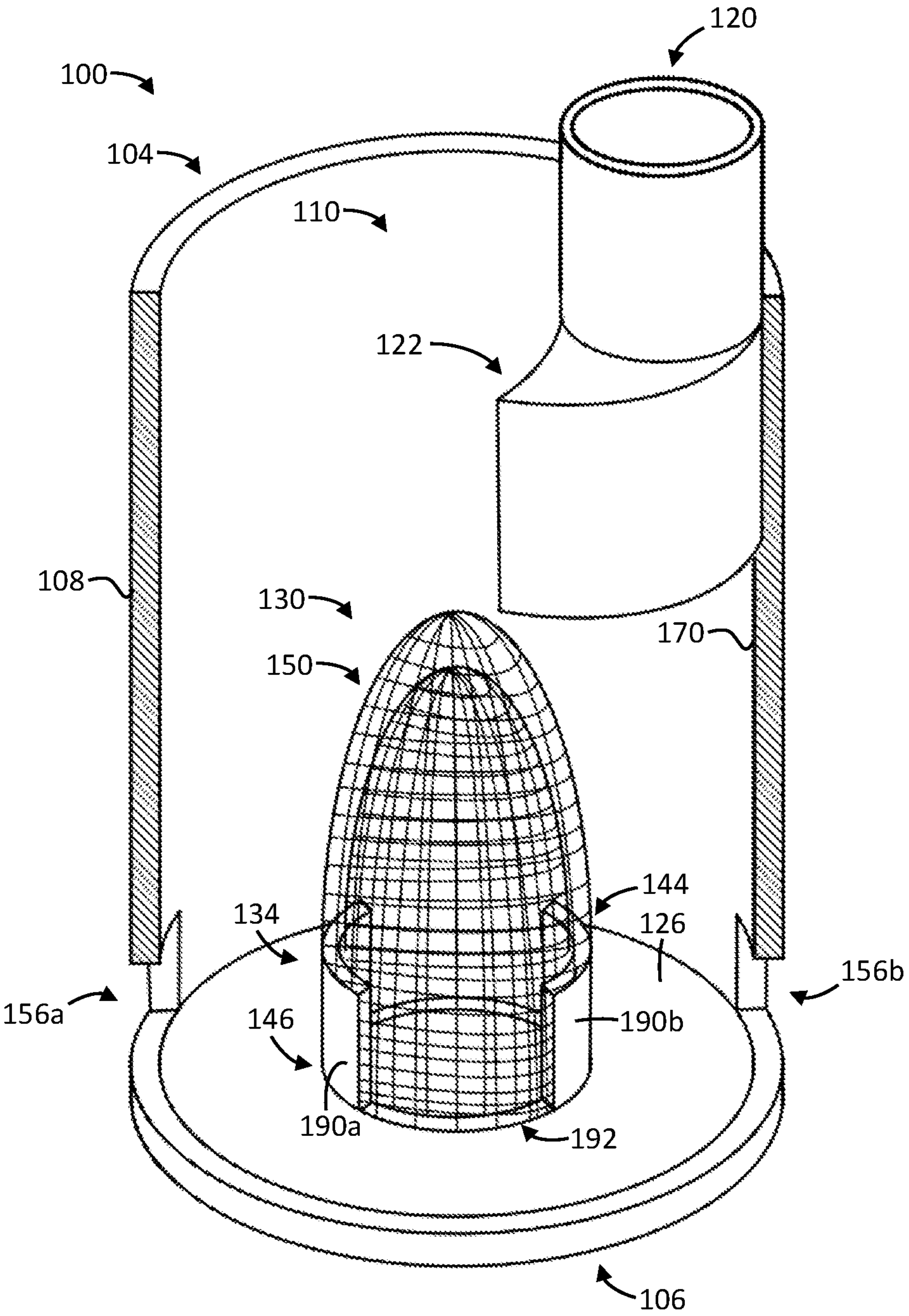
FIG. 5B is a perspective view of the cyclone of FIG. 5A, shown with a portion of the cyclone sidewall removed.

The cyclone 100 may have more than one dirt outlet 156. If the cyclone 100 includes more than one dirt outlet 156, a solid part 190 of the conduit portion 134 may face each dirt outlet 156. That is, if there are two dirt outlets 156*a*, 156*b*, the conduit portion 134 may have a first solid part 190*a* facing the first dirt outlet 156*a* and a second solid part 190*b* facing the second dirt outlet 156*b* (see for example FIG. 5B). If there are three dirt outlets, the conduit portion 134 may have a first solid part facing the first dirt outlet, a second solid part facing the second dirt outlet, and a third solid part facing the third dirt outlet.

Figure 5C:
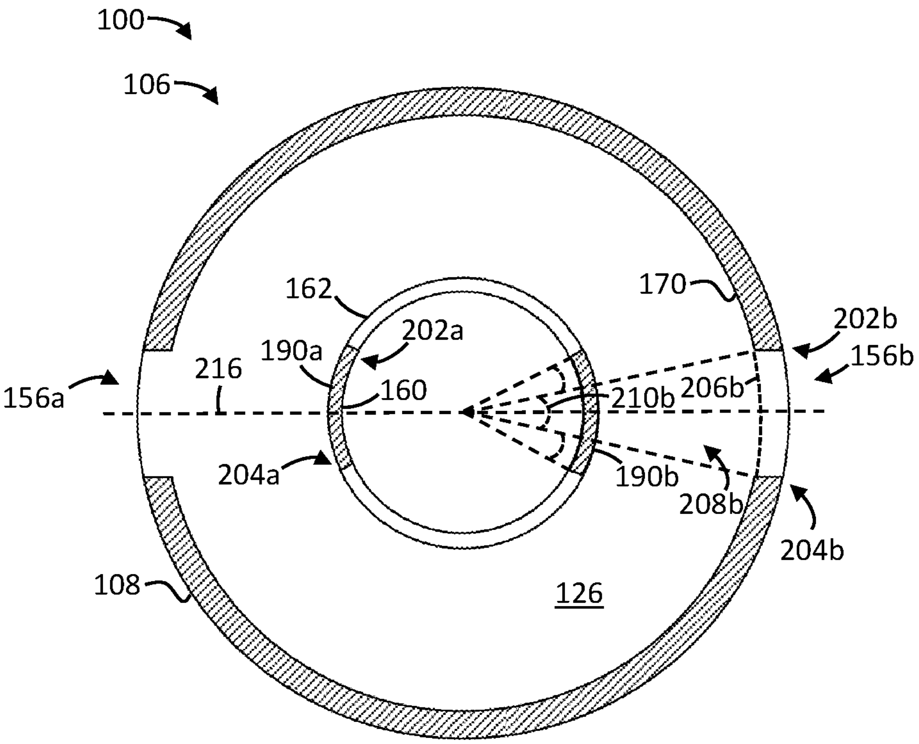
FIG. 5C is a cross-sectional view of the cyclone of FIG. 5A, taken along line 5C-5C.

As exemplified in FIG. 5C, the cyclone 100 has a first dirt outlet 156*a* and a second dirt outlet 156*b*. As shown, the conduit portion 134 has a first solid part 190*a* that faces the first dirt outlet 156*a* and a second solid part 190*b* that faces the second dirt outlet 156*b*. In the example illustrated, the second dirt outlet 156*b* is on an opposed side of the cyclone 100 from the first dirt outlet 156*a*. Specifically, in the example illustrated, a radial line 216 extends through the cyclone axis of rotation 116 and extends through each of the first and second dirt outlets 156*a*, 156*b*. As shown, the second dirt outlet 156*b* may have an arc length 206*b* defining a section 208*b* of the cyclone 100 and a second dirt outlet sector angle 210*b*. In some examples, the second dirt outlet sector angle 210*b* can be from 30° to 90°, or more particularly from 45° to 75°.

Still referring to FIG. 5C, the sector angle of the second solid part 190*b* of the conduit portion 134 can be measured with respect to the section 208*b* of the cyclone 100 defined by the second dirt outlet 156*b*. Specifically, in some examples, as shown in FIG. 5C, the second solid part 190*b* may extend from 5° to 90°, from 10° to 45°, or from 12° to 30° around the cyclone axis of rotation 116 in a first direction from the first end 202*b* of the second dirt outlet 156*b* and/or from 5° to 90°, from 10° to 45°, or from 12° to 30° around the cyclone axis of rotation 116 in a second opposed direction from the second end 204*b* of the second dirt outlet 156*b*.

Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus comprising:

(a) an air flow path from a dirty air inlet to a clean air outlet with a cyclone and a motor and fan assembly provided in the air flow path, (b) the cyclone comprising a cyclone axis of rotation centrally positioned in the cyclone and extending between an inlet end of the cyclone and an axially opposed outlet end of the cyclone, a cyclone sidewall extends between the inlet end and the axially opposed outlet end, the inlet end having a cyclone air inlet, the axially opposed outlet end comprising an outlet end wall and a vortex finder extending inwardly into the cyclone, (c) the vortex finder comprising a conduit portion extending inwardly into the cyclone and a screen portion, the conduit portion having an inlet end and an outlet end, and the screen portion extending inwardly into the cyclone from the inlet end of the conduit portion, the conduit portion has a radial width with a radial inner surface and a radial outer surface at the outlet end of the conduit portion, wherein, in a plane that is transverse to the cyclone axis of rotation and that extends through the conduit portion, the radial outer surface is located a first radial width from an inner surface of the cyclone sidewall and the radial inner surface is located a second radial width from the inner surface of the cyclone sidewall, and, (d) the cyclone air inlet has an outlet port having a width in a direction transverse to a direction of flow through the outlet port, wherein the width has a dimension that is between the first radial width and the second radial width, and wherein the outlet port has an outlet port cross-sectional flow area in the direction transverse to the direction of flow through the outlet port, and wherein the outlet port cross-sectional flow area is the same as or larger than a cross-sectional area of the conduit portion in the plane.

2. The surface cleaning apparatus of claim 1 wherein the cyclone has a diameter of up to 100 mm.

3. The surface cleaning apparatus of claim 2 wherein the vortex finder has a diameter of 25 mm to 40 mm.

4. The surface cleaning apparatus of claim 1 wherein the cyclone has a diameter of up to 80 mm and the conduit portion of the vortex finder has a diameter of up to 40 mm.

5. The surface cleaning apparatus of claim 1 wherein the conduit portion is tapered.

6. The surface cleaning apparatus of claim 5 wherein the conduit portion is tapered at an angle of up to 25°.

7. The surface cleaning apparatus of claim 5 wherein the conduit portion is tapered at an angle of 2°-15°.

8. The surface cleaning apparatus of claim 1 wherein the screen is tapered at an angle of up to 25°.

9. The surface cleaning apparatus of claim 1 wherein the cyclone air inlet is an axial air inlet, wherein the outlet port is provided in an inlet end wall of the cyclone.

10. The surface cleaning apparatus of claim 1 wherein the cyclone air inlet is a tangential air inlet wherein the outlet port is provided in the cyclone sidewall.

11. The surface cleaning apparatus of claim 1 wherein the cyclone has an air flow energy utilization for air flow through the cyclone of 1 CFM or more per 1 Watt.

12. The surface cleaning apparatus of claim 11 wherein the cyclone has a diameter of up to 100 mm.

13. The surface cleaning apparatus of claim 11 wherein the vortex finder has a diameter of 25 mm to 40 mm.

14. The surface cleaning apparatus of claim 11 wherein the cyclone has a diameter of up to 80 mm and the conduit portion of the vortex finder has a diameter of up to 40 mm.

15. The surface cleaning apparatus of claim 14 wherein the air flow energy utilization is 1.1 CFM per 1 Watt or more.

16. The surface cleaning apparatus of claim 14 wherein the air flow energy utilization is 1.25 CFM per 1 Watt or more.

17. The surface cleaning apparatus of claim 1 wherein the screen is tapered at an angle of 2°-15°.

* * * * *